US011553122B2

(12) United States Patent
Kei

(10) Patent No.: US 11,553,122 B2
(45) Date of Patent: Jan. 10, 2023

(54) IMAGE CAPTURING APPARATUS WHEREIN IMPACT APPLIED TO A DOME IS ABSORBED BASED ON GAP DISTANCING

(71) Applicant: CANON KABUSHIKI KAISHA, Tokyo (JP)

(72) Inventor: Hidetoshi Kei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/485,124

(22) Filed: Sep. 24, 2021

(65) Prior Publication Data
US 2022/0103727 A1 Mar. 31, 2022

(30) Foreign Application Priority Data

Sep. 25, 2020 (JP) .............................. JP2020-161440

(51) Int. Cl.
*H04N 5/335* (2011.01)
*H04N 5/225* (2006.01)
*H04N 5/232* (2006.01)
*G03B 17/56* (2021.01)
*G03B 17/12* (2021.01)

(52) U.S. Cl.
CPC ........... *H04N 5/2254* (2013.01); *G03B 17/12* (2013.01); *G03B 17/561* (2013.01); *H04N 5/23299* (2018.08)

(58) Field of Classification Search
CPC ...................................................... G03B 17/12
See application file for complete search history.

(56) References Cited

U.S. PATENT DOCUMENTS

| 2016/0330390 A1* | 11/2016 | Cho ..................... H04N 5/2252 |
| 2019/0331986 A1* | 10/2019 | Sasaki .................... G03B 17/02 |
| 2020/0145584 A1* | 5/2020 | Fukuzawa ............... F16M 13/02 |

FOREIGN PATENT DOCUMENTS

| JP | 2018013533 A | 1/2018 |
| JP | 2019117220 A | 7/2019 |

* cited by examiner

*Primary Examiner* — Gary C, VI EAUX
(74) *Attorney, Agent, or Firm* — Canon U.S.A., Inc. I.P. Division

(57) ABSTRACT

An image capturing apparatus according to the present disclosure includes first protrusion portions which are formed in a circumferential shape centered on a rotation axis of a lens barrel on at least one of an inside of an exterior case and an outside of the lens barrel, and in a cross section including a tilt axis, a protrusion amount of the first protrusion portions is determined in such a manner that a clearance between the exterior case and the lens barrel is smaller than a clearance between an inner circumferential surface of the dome member and an outer circumferential surface where an outermost lens of the lens barrel is formed.

6 Claims, 23 Drawing Sheets

IMAGE CAPTURING APPARATUS WHEREIN IMPACT APPLIED TO A DOME IS ABSORBED BASED ON GAP DISTANCING

BACKGROUND

Field of the Disclosure

The present disclosure generally relates to an image capturing apparatus and more specifically relates to an image capturing apparatus including a driven body to be driven by an actuator.

Description of the Related Art

In some conventional electronic devices provided with an actuator, a lens unit is configured to be operable in a panning rotation direction and a tilt rotation direction by the actuator.

In an electronic device discussed in Japanese Patent Application Laid-Open No. 2019-117220, a lens unit rotatable about each of a first rotation axis and a second rotation axis is driven by an actuator disposed in the electronic device.

A periphery of the lens unit and the actuator is covered by a plurality of exterior covers.

An elastic member (O-ring) is disposed at a joint portion of the plurality of exterior covers, and at the time of fastening the exterior covers, the elastic member (O-ring) is held to be compressed, so that the electronic device can maintain airtightness and have dust-proof and drip-proof performance.

In recent years, small-sized cameras, such as surveillance cameras, which can capture images while tracking moving objects have become common.

The above-described camera can be used by being placed on a desk or fixed on a ceiling, and a structure for covering a lens unit with a transparent dome member is often adopted in order to protect the lens.

According to Japanese Patent Application Laid-Open No. 2018-13533, an electronic device is installed on a ceiling, and a lens unit is protected by a dome member.

Further, the electronic device has a gap inside and is held in a state of being urged by a spring, so that, in a case where an impact is applied to the dome member from the outside, the impact is absorbed by a stroke movement in a pressed direction by a distance of the gap, and failure of the electronic device is prevented.

However, according to the conventional technique discussed above in Japanese Patent Application Laid-Open No. 2019-117220, a space for arranging the elastic member (O-ring) at the joint portion of the plurality of exterior covers is required to realize the dust-proof and drip-proof performance of the electronic device and causes increase in a size and component costs of the electronic device.

The electronic device can prevent dust from entering from the outside by being sealed with the elastic member (O-ring) but may not prevent dust generated inside an actuator unit and the like from moving to the lens unit.

SUMMARY

Therefore, a first aspect of the present disclosure is directed to providing a small-sized image capturing apparatus which can prevent dust and the like generated in an actuator unit from moving to a lens unit.

According to the conventional technique discussed above in Japanese Patent Application Laid-Open No. 2018-13533, a space for a stroke to absorb an impact is required inside the electronic device to realize an impact resistant performance, which causes increase in a size of the electronic device.

There is also an issue that a structure becomes complicated due to a need of a spring mechanism for applying a force to the electronic device.

Therefore, a second aspect of the present disclosure is directed to providing an image capturing apparatus capable of preventing damage to a dome member which protects a rotatable lens unit without causing enlargement and complication of the image capturing apparatus.

According to an aspect of the present disclosure, an image capturing apparatus includes an exterior case, a lens barrel configured to hold a lens, to be disposed in the exterior case, and to be held rotatably around a tilt axis extending in a direction different from a direction of an optical axis of the lens, a bearing unit configured to hold the lens barrel to perform tilt rotation, an actuator configured to be held by the bearing unit and to generate a driving force for rotating the lens barrel, and, a dome member configured to be attached to the exterior case and to cover an area on an object side of the lens barrel, wherein a first protrusion portion is formed in a circumferential shape centered on a rotation axis of the lens barrel on at least one of an inside of the exterior case and an outside of the lens barrel, and wherein, in a cross section including the tilt axis, a protrusion amount of the first protrusion portion is determined in such a manner that a clearance between the exterior case and the lens barrel is smaller than a clearance between an inner circumferential surface of the dome member and an outer circumferential surface where an outermost lens of the lens barrel is formed.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings.

According to the present exemplary embodiment, a description will be given of a case in which the present disclosure is applied to a camera as an image capturing apparatus in which a lens barrel is held rotatably in a tilt direction and a panning direction. However, an application of the present disclosure is not limited to this case.
(Drawing of External Appearance of Camera)

Figure 1A:
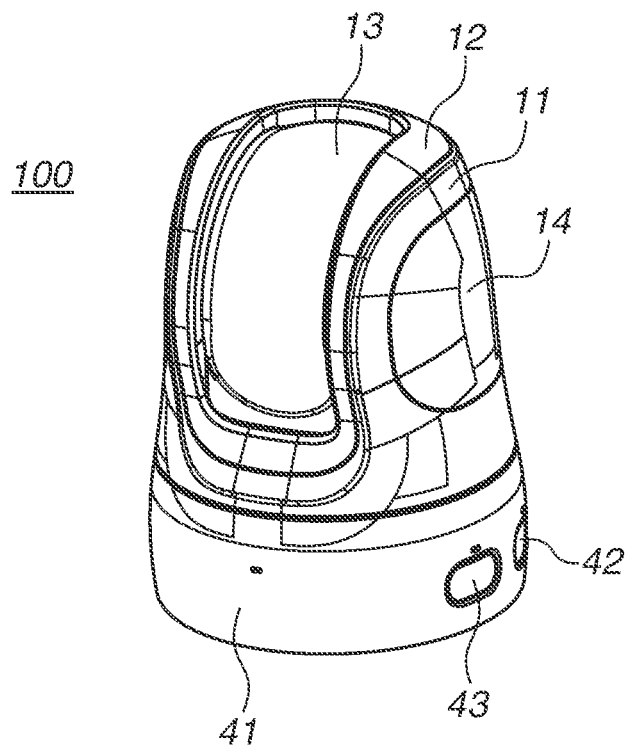
FIGS. 1A and 1B are diagrams each illustrating a perspective view of an example of an image capturing apparatus according to an exemplary embodiment of the present disclosure.
Figure 1B:
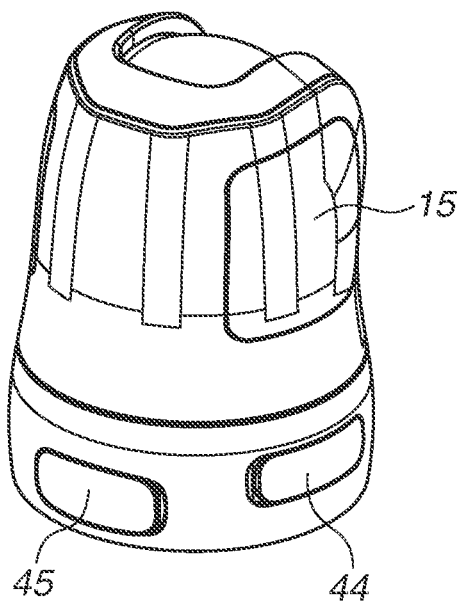

FIGS. 1A and 1B illustrate an external appearance of a camera as an image capturing apparatus according to the present exemplary embodiment. FIGS. 1A and 1B are perspective views of the camera from a front direction and from a rear surface direction, respectively.

In FIG. 1A, a camera 100 (also referred to as a camera body 100 and an image capturing apparatus 100) has an exterior formed of a top cover 11 (also referred to as an exterior case 11) which covers an upper portion and side covers 14 and 15 which cover side surface portions. Further, a dome member 13 which is formed of a transparent material and covers a front portion and the upper portion of the camera 100 and an outer cover 12 (also referred to as a frame member 12) which is disposed to form a frame around the dome member 13 are fixed to the exterior of the camera 100. The dome member 13 is formed of a transparent material, such as a polycarbonate resin and an acrylic resin. According to the present exemplary embodiment, an acrylic resin having a high light transmittance is used. A bottom cover 41 is formed to cover a bottom portion of the camera 100, and a main board (not illustrated) on which a processing circuit for converting image data generated by an image capturing element into digital information, an auxiliary board (not illustrated), and a main battery (not illustrated) as a power supply are included inside the bottom cover 41.

A power supply button 43 and a communication button 42 are disposed on a side surface of the bottom cover 41. If a user presses the power supply button 43, the camera 100 is switched from an OFF state as an unused state to an ON state as a usable state, or from the ON state to the OFF state. The communication button 42 is a button to be used in wireless connection with a communication terminal other than the camera 100 and is used to perform an operation, such as remote image capturing and transmission of a captured image, from a terminal device such as a smartphone. Further, a jack cover 44 and a memory card cover 45 are disposed on the bottom cover 41. An input/output jack (not illustrated) for power supply and signals is provided inside the jack cover 44, and various cables can be connected and disconnected thereto at the time of use. A card slot through which a memory card for recording a captured image can be inserted into and removed from the camera 100 is disposed inside the memory card cover 45.

The image capturing apparatus 100 according to the present exemplary embodiment includes a lens barrel 20 (also referred to as a lens barrel unit 20) and a bearing unit 30. The lens barrel 20 which holds a lens is disposed in an exterior case, and is held rotatably around a tilt axis extending in a direction different from that of an optical axis of the lens. The bearing unit 30 holds the lens barrel 20 rotatably in the tilt direction.

The image capturing apparatus 100 further includes a drive actuator 36, which is held by the bearing unit 30 and generates a driving force for rotating the lens barrel 20, and the dome member 13, which is attached to the exterior case 11 and covers an area on an object side of the lens barrel 20.
(Description of Block Diagram in FIG. 23)

Figure 23:
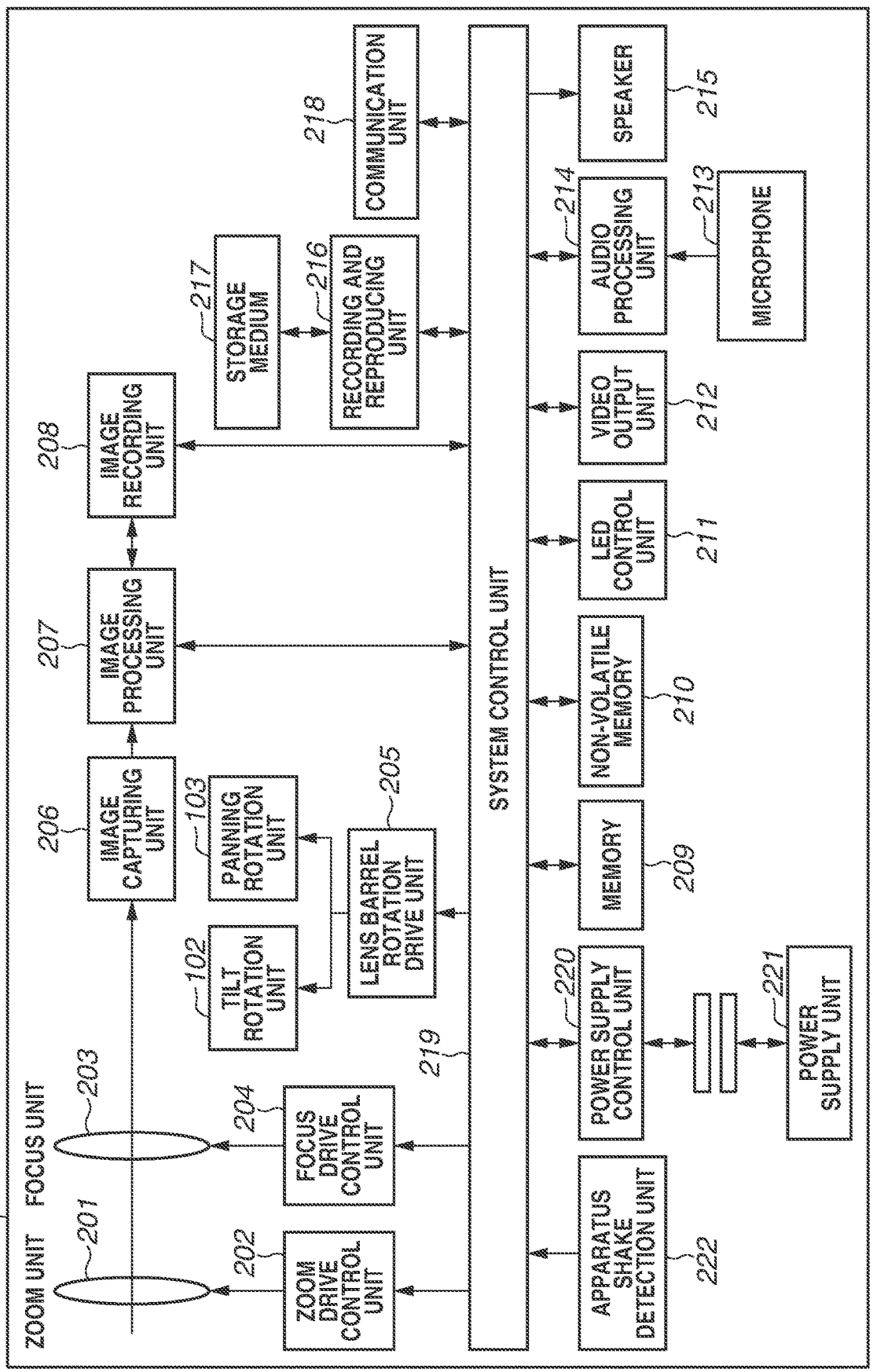
FIG. 23 is a block diagram illustrating a system of the image capturing apparatus.

FIG. 23 is a block diagram illustrating an example of a configuration of the camera 100 as an example of the image capturing apparatus according to the present disclosure. In FIG. 23, a system control unit 219 includes a processor (for example, a central processing unit (CPU), a graphics processing unit (GPU), a microprocessor, and a micro processing unit (MPU)) and a memory (for example, a dynamic random access memory (DRAM) and a static random access memory (SRAM)). The system control unit 219 executes various types of processing to control each block in the image capturing apparatus 100. A non-volatile memory (an electrically erasable and programmable read only memory (EEPROM)) 210 is an electrically erasable and recordable memory and stores a constant, a program, and the like for an operation of the system control unit 219.

In FIG. 23, a zoom unit 201 includes a zoom lens which varies magnification. A zoom drive control unit 202 controls driving of the zoom unit 201. A focus unit 203 includes a lens for adjusting focus. A focus drive control unit 204 controls driving of the focus unit 203.

In an image capturing unit 206, the image capturing element, such as a charge coupled device (CCD) and a complementary metal oxide semiconductor (CMOS), which converts an optical image input through an optical system into an electrical signal outputs information about an electric charge corresponding to an amount of incident light as analog image data to an image processing unit 207. The image processing unit 207 applies image processing, such as distortion correction, white balance adjustment, and color interpolation processing, to digital image data output by analog-to-digital (A/D) conversion and outputs the image-processed digital image data. The digital image data output from the image processing unit 207 is converted into a recording format, such as a Joint Photographic Experts Group (JPEG) format, by an image recording unit 208 and is transmitted to a memory 209 and a video output unit 212.

A lens barrel rotation drive unit 205 drives a tilt rotation unit 102 and a panning rotation unit 103 to drive the lens barrel 20 in the tilt direction and the panning direction.

An apparatus shake detection unit 222 is equipped with, for example, an angular velocity meter (a gyro sensor) and an accelerometer (an acceleration sensor) which detect an angular velocity and acceleration, respectively, in three axial directions of the image capturing apparatus 100. The apparatus shake detection unit 222 calculates a rotation angle, a shift amount, and the like of the image capturing apparatus 100, based on a detected signal.

A microphone (an audio input unit) 213 acquires an audio signal around the image capturing apparatus 100, performs A/D conversion on the audio signal via an amplifier, and then transmits the converted audio signal to an audio processing unit 214. The audio processing unit 214 performs audio-related processing, such as optimization processing of the input digital audio signal. Then, the audio signal processed by the audio processing unit 214 is transmitted to the memory 209 by the system control unit 219. The memory 209 temporarily stores the image signal and the audio signal obtained from the image processing unit 207 and the audio processing unit 214.

The image processing unit 207 and the audio processing unit 214 read the image signal and the audio signal temporarily stored in the memory 209 and perform encoding on the image signal and the audio signal to generate a compressed image signal and a compressed audio signal. The system control unit 219 transmits the compressed image signal and the compressed audio signal to a recording and reproducing unit 216. The recording and reproducing unit 216 stores the compressed image signal and the compressed audio signal generated by the image processing unit 207 and the audio processing unit 214 and other control data related to image capturing in a storage medium 217.

The storage medium 217 may be a storage medium built in the image capturing apparatus 100 or a removable storage medium. The storage medium 217 can store various data, such as the compressed image signal, the compressed audio signal, and the audio signal generated in the image capturing apparatus 100, and a medium having a capacity larger than that of the non-volatile memory 210 is generally used as the storage medium 217. For example, the storage medium 217 includes all types of storage media, such as a hard disk, an optical disk, a magneto-optical disk, a compact disk recordable (CD-R), a digital versatile disc recordable (DVD-R), a magnetic tape, a non-volatile semiconductor memory, and a flash memory.

The recording and reproducing unit 216 reads (reproduces) the compressed image signal, the compressed audio signal, the audio signal, various data, and a program stored in the storage medium 217. Then, the system control unit 219 transmits the read compressed image signal and compressed audio signal to the image processing unit 207 and the audio processing unit 214. The image processing unit 207 and the audio processing unit 214 temporarily store the compressed image signal and the compressed audio signal in the memory 209, decode the signals according to predetermined procedures, and transmit the decoded signals to the video output unit 212 and a speaker (an audio output unit) 215. The speaker (the audio output unit) 215 outputs a preset audio pattern at the time of image capturing and the like.

A light-emitting diode (LED) control unit 211 controls an LED provided to the image capturing apparatus 100 to turn on and blink the LED at a preset pattern at the time of image capturing and the like. The video output unit 212 includes, for example, a video output terminal and transmits the image signal to display a video on a connected external display and the like.

A communication unit 218 performs communication between the image capturing apparatus 100 and an external apparatus and transmits and receives data, such as the audio signal, the image signal, the compressed audio signal, and the compressed image signal. The communication unit 218 receives image capturing start and end commands and a control signal related to image capturing, such as pan, tilt, and zoom driving, and drives the image capturing apparatus 100 according to an instruction from an external apparatus which can mutually communicate with the image capturing apparatus 100. The communication unit 218 is a wireless communication module, such as an infrared communication module, a Bluetooth® communication module, a wireless local area network (LAN) communication module, and a global positioning system (GPS) receiver.

A power supply control unit 220 includes a battery detection circuit, a direct current to direct current (DC-DC) converter, and a switch circuit for switching a block to be energized and detects whether the battery is mounted, a type of the battery, and a remaining battery capacity. The power supply control unit 220 controls the DC-DC converter, based on a detection result and an instruction from the system control unit 219, and supplies a necessary voltage to each unit including the storage medium 217 for a necessary period. A power supply unit 221 includes a primary battery, such as an alkaline battery and a lithium battery, a secondary battery, such as a nickel-cadmium (NiCd) battery, a nickel metal hydride (Ni-MH) battery, and a lithium (Li) battery, and an alternate current (AC) adapter. The power supply unit 221 and the power supply control unit 220 are connected to each other by a camera side power supply connector and a power supply connector.

(Exploded Perspective View of Unit Configuration of Camera 100)

Figure 2:
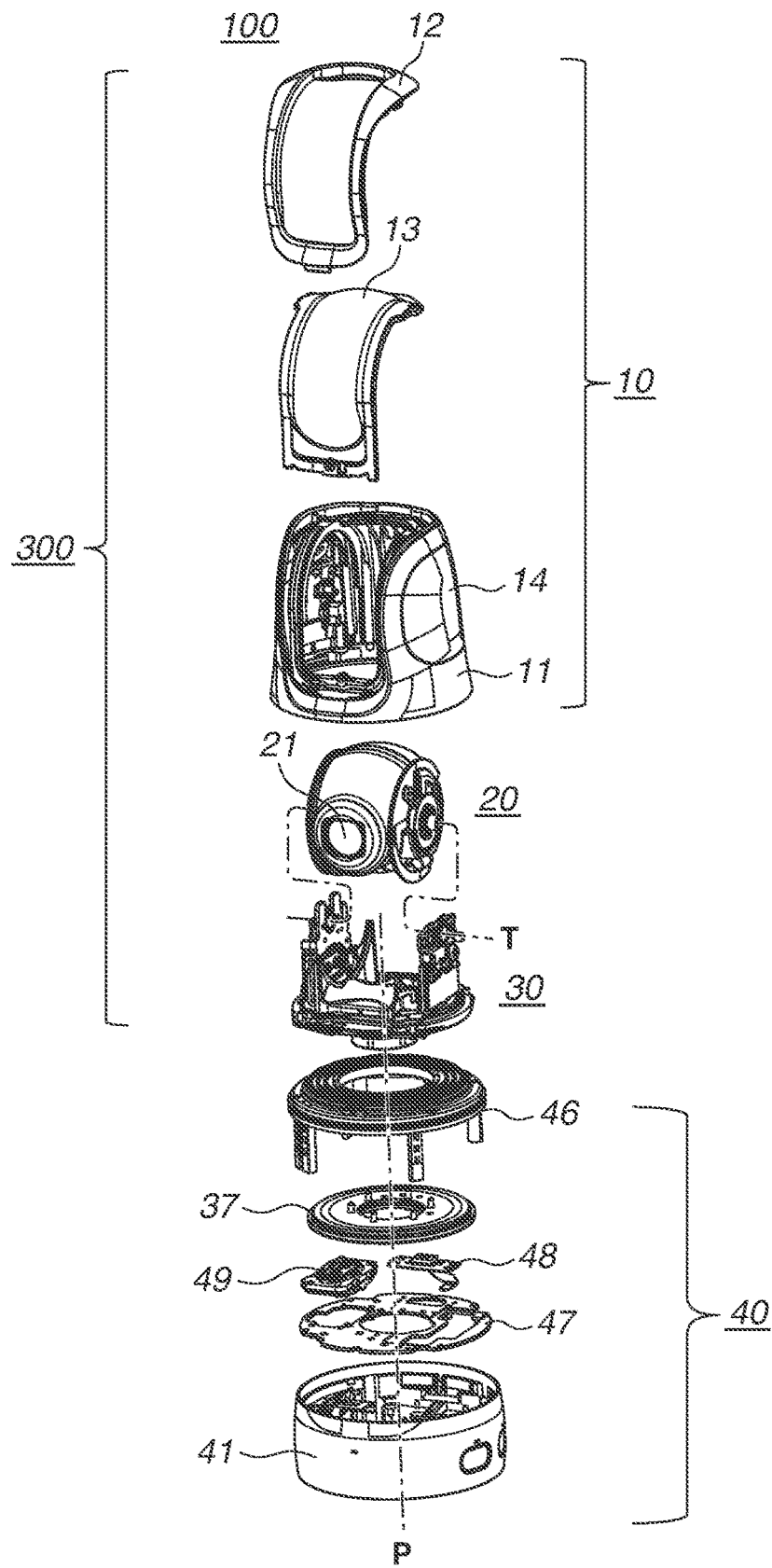
FIG. 2 is a diagram illustrating an exploded perspective view illustrating the image capturing apparatus.

FIG. 2 is an exploded perspective view of a unit configuration of the camera 100 in FIGS. 1A and 1B. The lens barrel unit 20 including a lens group of an imaging optical system is attached inside the camera 100. The lens barrel unit 20 is held rotatably in the tilt rotation with respect to the bearing unit 30 and is pivotally supported around a T axis in FIG. 2. The T axis represents a center axis of the tilt rotation and extends in a direction perpendicular to an image capturing optical axis of the lens barrel unit 20. The lens barrel unit 20 holds the lens and is disposed in the exterior case 11. A plurality of lens groups (not illustrated) is held inside the lens barrel unit 20, and a G1 lens 21 is fixed to an opening portion on a front surface of the lens barrel unit 20. The lens barrel unit 20 is held rotatably around the tilt axis extending in a direction different from that of the optical axis of the lens.

The bearing unit 30 includes a bearing member for holding the lens barrel 20 rotatable in a tilt rotation. A part of the bearing unit 30 fits into a through hole on the center of a main base 46, and the bearing unit 30 is rotatably supported around a P axis. The P axis represents a center axis of a panning rotation, and the T axis and the P axis are defined in directions perpendicular to each other. A rotation plate 37 is fixed to the bearing unit 30 while holding the main base 46 between the rotation plate 37 and the bearing unit 30 and rotates integrally with the bearing unit 30 around the P axis. A pattern for detecting a rotation position is formed on the rotation plate 37 and is detected by a position detection sensor 48. A driving force is transmitted to the rotation plate 37 by a panning drive actuator 49, and the bearing unit 30 is driven to rotate. The main base 46 is fastened and fixed to the bottom cover 41 with screws via a main plate 47.

Next, a description will be given of a top cover unit 10 which forms the upper portion of the camera 100.

In the top cover unit 10, the dome member 13 which is formed of the transparent material to cover the front surface and a top surface of the lens barrel unit 20 is fixed to the top cover 11. A shape of the dome member 13 is formed to cover an image capturing area in a range in which the lens barrel unit 20 performs a tilt rotation. The dome member 13 covers the area on the object side of the lens barrel 20.

The outer cover 12 is fixed to an outside of the dome member 13 to form the frame of the dome member 13. According to the present exemplary embodiment, a double-sided adhesive tape (not illustrated) is used for adhesion. The top cover unit 10, the lens barrel unit 20, and the bearing unit 30 are integrated to form a panning unit 300. The rotation plate 37 is driven to rotate by the panning drive actuator 49 as described above, and thus the panning unit 300 can perform a panning rotation around the P axis with respect to a fixing unit 40.

(Structure for Tilt Rotation Driving of Lens Barrel Unit 20)

Next, a structure for driving the lens barrel unit 20 to perform a tilt rotation is described with reference to FIGS. 3A, 3B, 4A, and 4B.

In the lens barrel unit 20, a tilt cover 22 covering the front surface and a rear surface cover 23 covering a rear surface are integrated to form a housing, and a plurality of lens groups (not illustrated) for image capturing and the image capturing element (not illustrated) are disposed inside the housing. The G1 lens 21 is disposed in the opening portion on a front side of the tilt cover 22 and a lens surface is exposed to an external appearance of the lens barrel unit 20. A tilt rotation plate 25 formed of a sheet metal material is attached to a side surface of the lens barrel unit 20, and a reflection scale 24 for position detection is attached to an opposite side surface.

A bearing member 32 having a rotation center centered at the T axis in the bearing unit 30 is attached to a bearing plate 35 formed of a square U-shaped sheet metal material. Shaft portions 22a on both side surfaces of the tilt cover 22 are fitted to two bearing members 32, so that the lens barrel unit 20 is held rotatably in the tilt direction in a predetermined angle range around the T axis in FIGS. 3A and 3B. The bearing plate 35 is fixed to a base member 34 at a bottom surface portion. The drive actuator 36 for a tilt rotation is disposed on the bearing plate 35 and transmits a rotation driving force to the tilt rotation plate 25.

An optical sensor 33 for rotation position detection is disposed on the bearing plate 35 at a position facing the reflection scale 24. The optical sensor 33 is connected to a control circuit board (not illustrated) built in an apparatus body of the camera 100 by a flexible printed circuit (FPC) 33a. A plurality of light and dark patterns arranged in a circumferential direction at regular intervals around the T axis is formed on the reflection scale 24, and a rotation position of the lens barrel unit 20 is detected by reading brightness and darkness of the patterns with the optical sensor 33. As a base material of the reflection scale 24, an acrylic resin, a polycarbonate resin, and the like are used. The reflection scale 24 includes an optical grating which is made of an aluminum film and formed as a reflection film on a surface of the base material. The base material of the reflection scale 24 a tilt rotation is not limited to the above-described materials, and for example, quartz glass, blue plate glass, and a silicon wafer may be used. For example, a chromium film may be used as the optical grating.

(Exploded Perspective View of Lens Barrel Unit 20 and Bearing Unit 30)

Figure 4A:
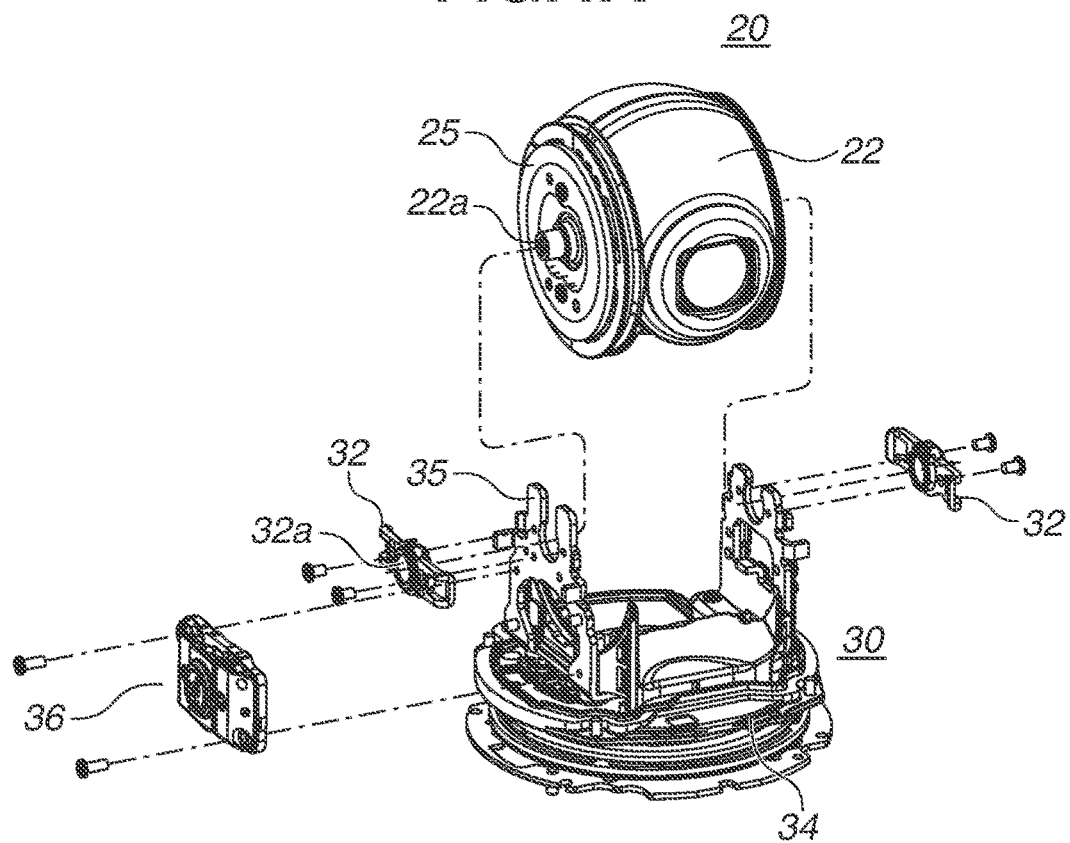
FIGS. 4A and 4B are diagrams each illustrating an exploded perspective view of the internal structure of the image capturing apparatus.
Figure 4B:
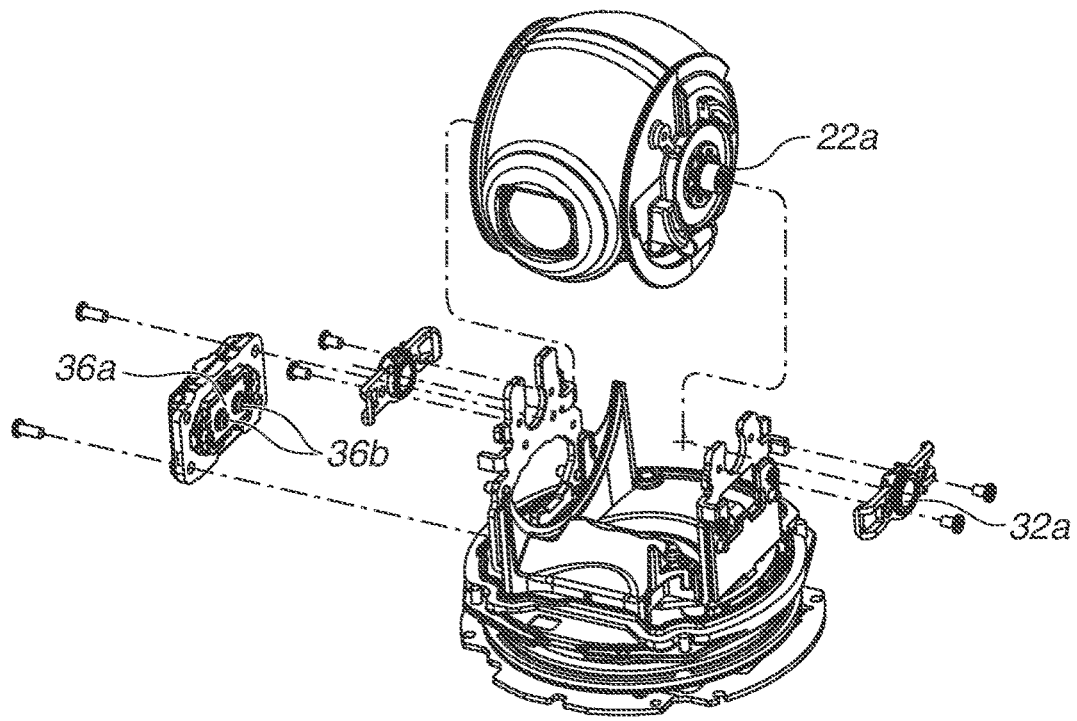

FIGS. 4A and 4B are exploded perspective views of the lens barrel unit 20 and the bearing unit 30. The two bearing members 32 are fastened to the bearing plate 35 with screws.

Figure 3A:
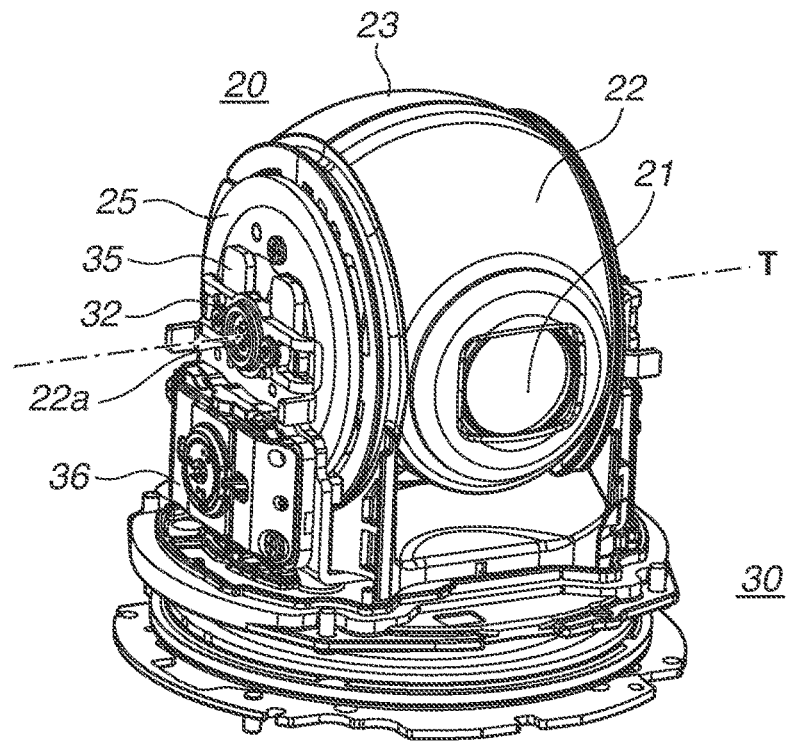
FIGS. 3A and 3B are diagrams each illustrating an internal structure of the image capturing apparatus.
Figure 3B:
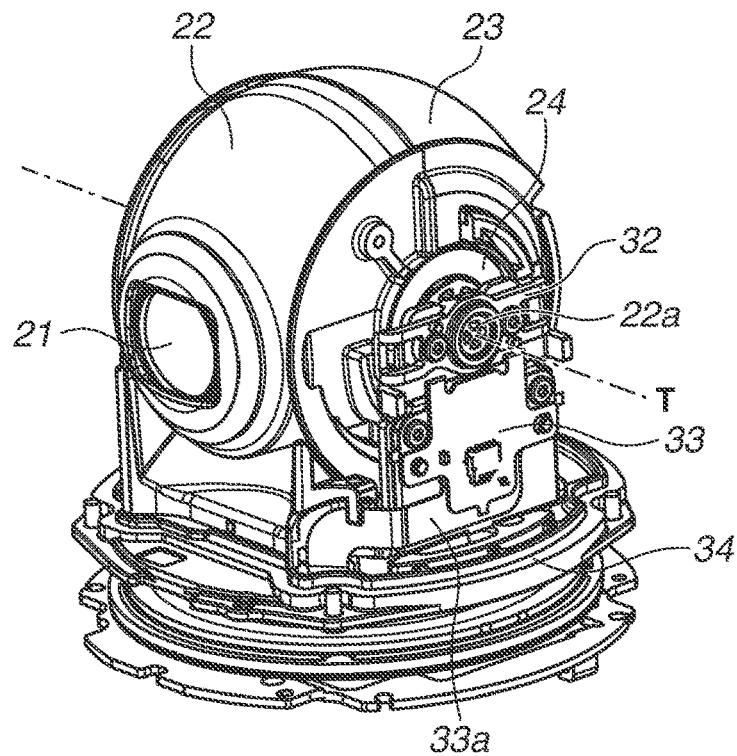

A center of an insertion hole 32a of each bearing member 32 is arranged to coincide with the T axis in FIGS. 3A and 3B. The shaft portion 22a of the tilt cover 22 fits into the insertion hole 32a of the bearing member 32 so that the lens barrel unit 20 is assembled. The lens barrel unit 20 can rotate and move around the T axis with respect to the bearing unit 30. The drive actuator 36 is fixed to the bearing plate 35 with screws in a state of a unit including a plurality of components.

As illustrated in FIG. 4B, two projection portions 36b are formed on a vibrator 36a (also referred to as a transmission unit 36a) in the drive actuator 36. In an assembly state, the vibrator 36a is pressed to the tilt rotation plate 25 of the lens barrel unit 20 by an inner spring (not illustrated). According to the present exemplary embodiment, an ultrasonic motor is adopted as the configuration of the drive actuator 36, a certain high-frequency voltage is applied to a piezoelectric element (not illustrated) provided inside the drive actuator 36, and thus an ultrasonic vibration is applied to the vibrator 36a. If the high-frequency voltage is applied to the piezoelectric element (not illustrated), a vibration of an arbitrary frequency is excited in the vibrator 36a, and a driving force for driving a driven body is generated at a contact point between the projection portions 36b of the vibrator 36a and the tilt rotation plate 25. Since the vibrator 36a is in pressure contact with a side surface of the tilt rotation plate 25, the driving force is transmitted to the tilt rotation plate 25 and relatively moves the lens barrel unit 20 with respect to the bearing unit 30.

(Configuration for Preventing Abrasion Powder Generated in Drive Actuator 36 from Moving inside Apparatus)

A description will be given of a configuration for preventing abrasion powder generated in the drive actuator 36 from moving inside the apparatus is described with reference to FIGS. 5 to 10A and 10B.

As described above with reference to FIGS. 4A and 4B, the drive actuator 36 drives the driven body by applying the ultrasonic vibration in a state where the projection portions 36b of the vibrator 36a are in pressure contact with the tilt rotation plate 25. Thus, fine abrasion powder due to scraping or the like is generated at a tip portion of the projection portions 36b with a lapse of time. The abrasion powder is mainly generated due to scraping of the tip portion of the vibrator 36a, and if the abrasion powder moves inside the apparatus and enters in a range of an imaging field angle of the lens, there is a concern that the abrasion powder is captured in a captured image.

A description will be given of the configuration, according to the present exemplary embodiment, for preventing the abrasion powder from moving to an image capturing lens unit.

(Drawing of External Appearance of Lens Barrel Unit 20)

Figure 5:
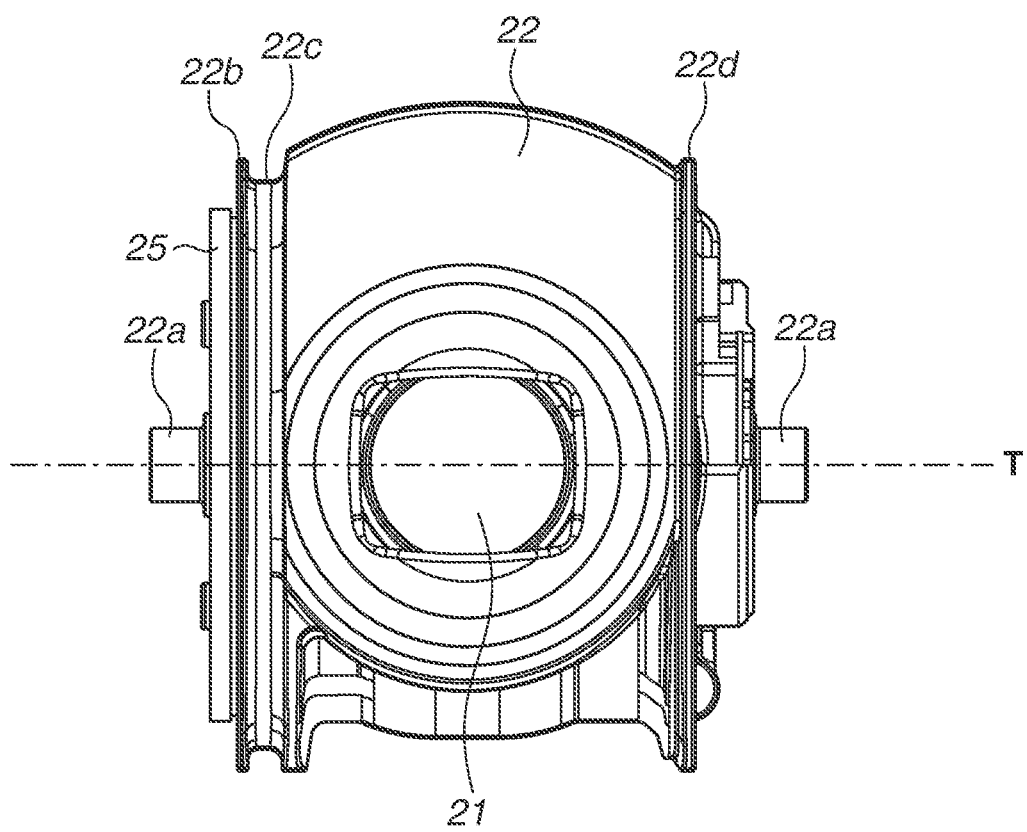
FIG. 5 is a diagram illustrating a lens barrel unit of the image capturing apparatus.

FIG. 5 illustrates the external appearance of the lens barrel unit 20. The tilt cover 22 includes the opening portion on the front surface, and the G1 lens 21 is held in the opening portion so that the G1 lens 21 is exposed to the external appearance. The shaft portions 22a centering on the T axis as a rotation axis are formed on both side surfaces of the tilt cover 22. An annular rib 22b convexly extending in a circumferential direction is formed on a side of the tilt cover 22 on which the tilt rotation plate 25 is fixed, and an annular groove 22c which is concaved in the circumferential direction is formed on a side of the annular rib 22b. Similarly, an annular rib 22d convexly extending in the circumferential direction is formed on a side surface opposite to the side on which the tilt rotation plate 25 is fixed to the tilt cover 22.

(Cover Configuration Around Lens Barrel Unit 20)

Figure 6:
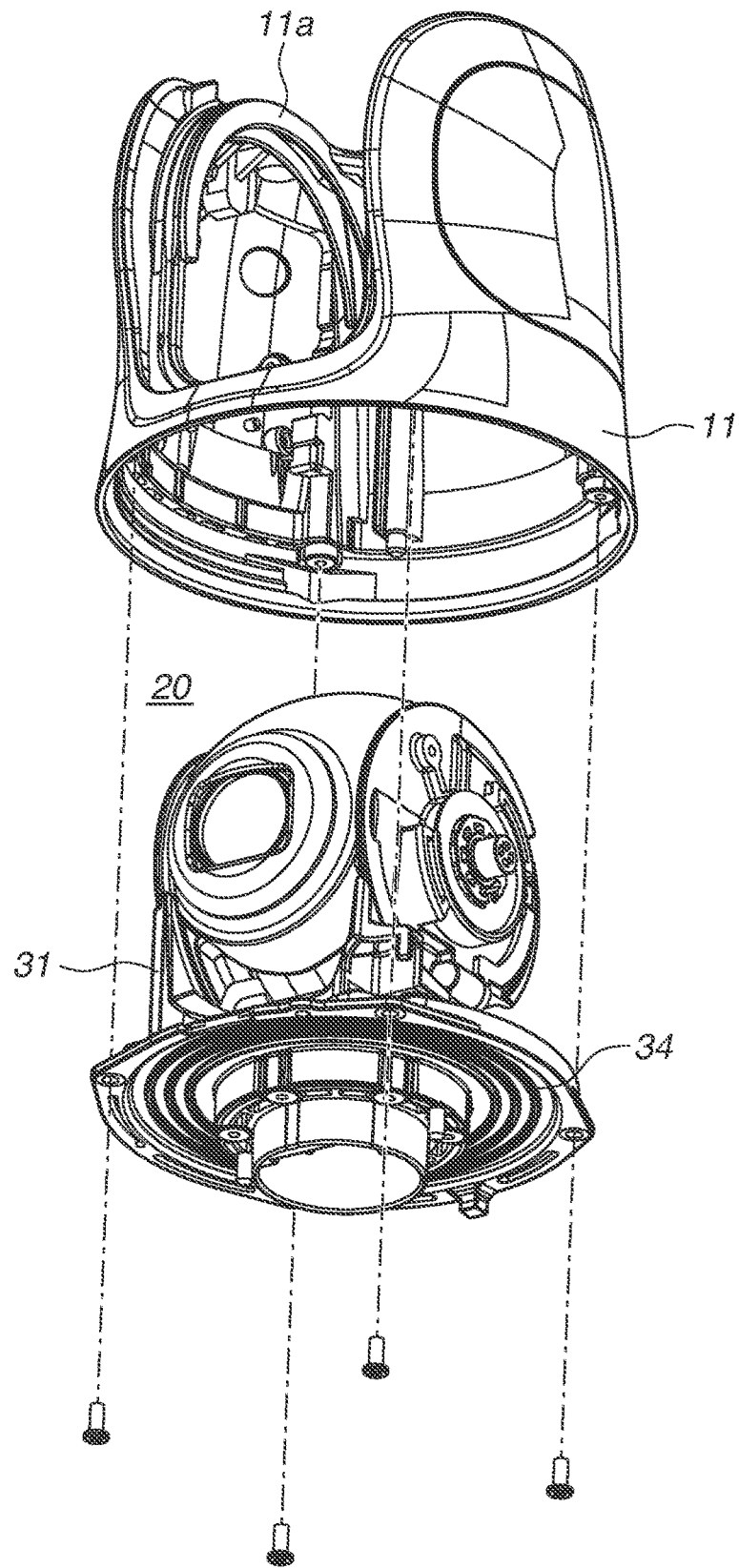
FIG. 6 is a diagram illustrating a method for mounting a panning unit of the image capturing apparatus.

Next, a cover configuration around the lens barrel unit 20 is described with reference to FIG. 6.

The base member 34 is fastened to the top cover 11 with a plurality of screws in a state in which the lens barrel unit 20 is rotatably held by the bearing unit 30. A spacer member 31 is also fixed to the base member 34 in a lower portion of the lens barrel unit 20. Further, the top cover 11 is attached to the upper portion of the lens barrel unit 20 to cover the outside. An opening portion is formed on the top cover 11 in a range in which the lens barrel unit 20 performs a tilt rotation.

(Rib Shape of Lens Barrel Unit 20 and Spacer Member 31)

Figure 7:
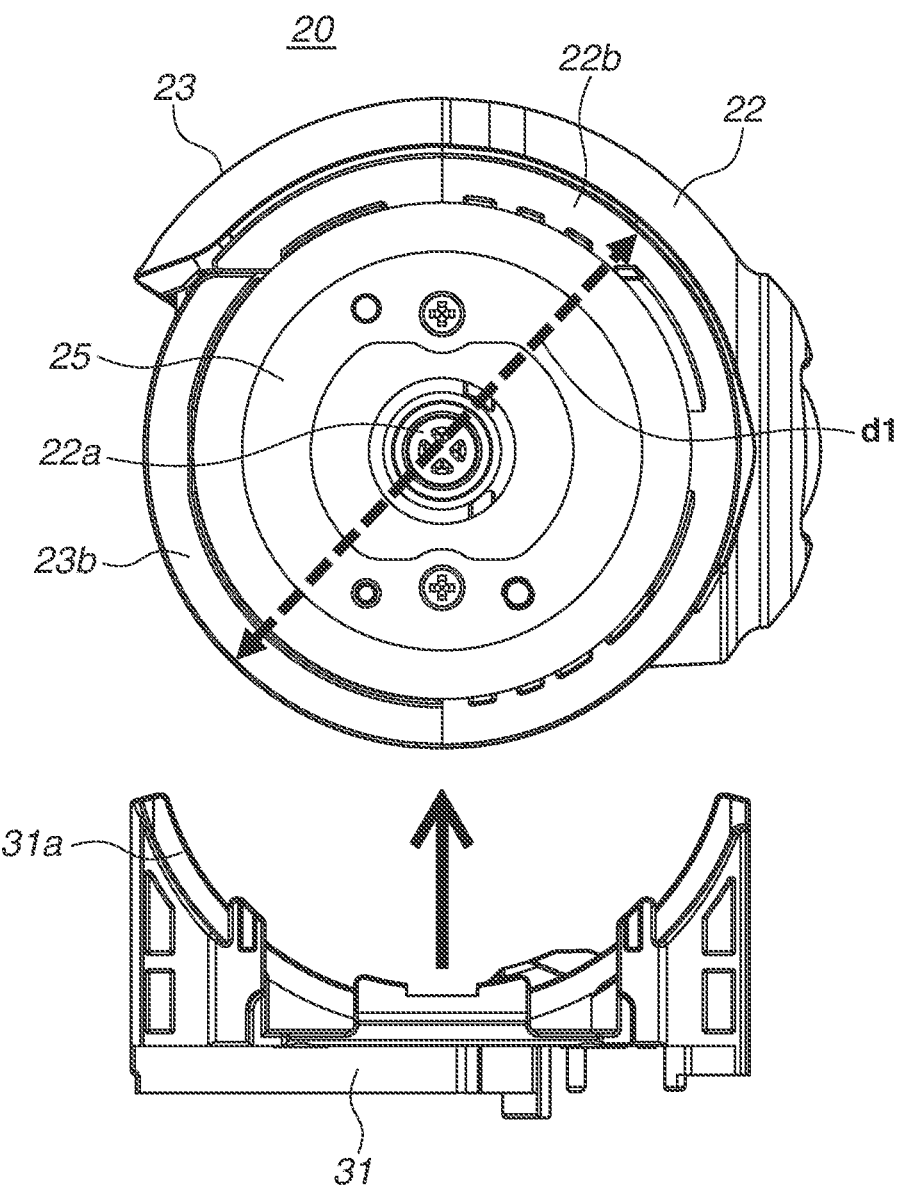
FIG. 7 is a diagram illustrating a rib structure inside the image capturing apparatus.

FIG. 7 illustrates rib shapes of the lens barrel unit 20 and the spacer member 31. Other components which are not necessary for describing the rib shape as a protrusion portion are omitted. Similar to the annular rib 22b of the tilt cover 22, a semicircular annular rib 23b is also formed on the rear surface cover 23, and two semicircular annular ribs 22b and 23b are integrated to form a 360-degree annular rib in a circumferential shape. In FIG. 7, the 360-degree annular rib formed by the annular ribs 22b and 23b has a diameter d1. The spacer member 31 is incorporated from a lower side of the lens barrel unit 20 in a direction of an arrow in FIG. 7.

A convex rib 31a having a substantially semicircular shape is formed on the spacer member 31 so that its center axis coincides with that of the annular ribs 22b and 23b formed by the tilt cover 22 and the rear surface cover 23.

(Rib Shape inside Lens Barrel Unit 20 and Top Cover 11)

Figure 8:
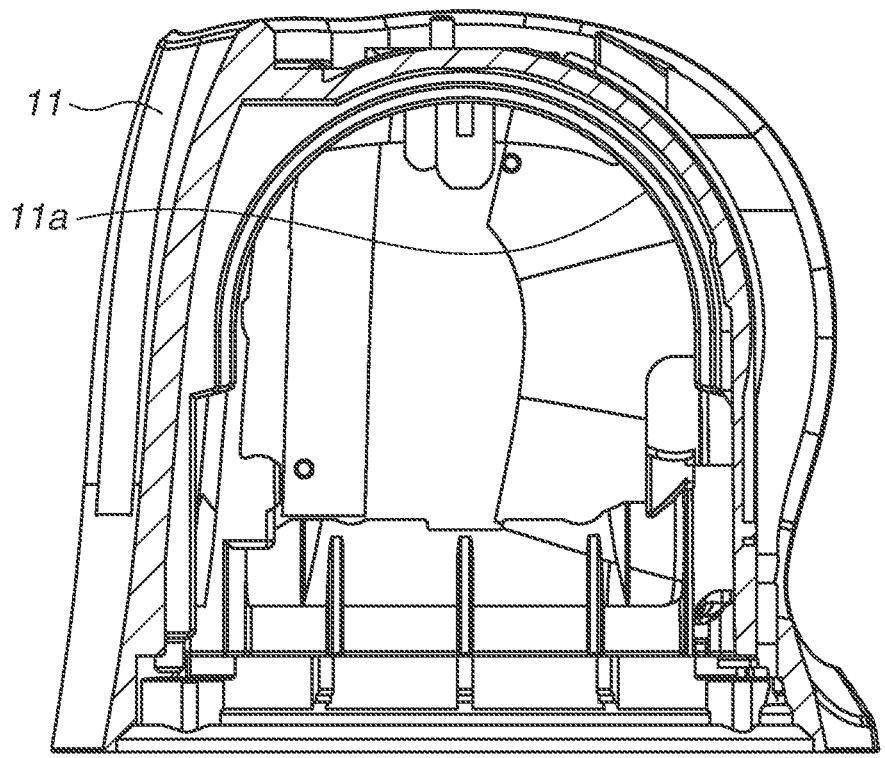
FIG. 8 is a diagram illustrating the rib structure inside the image capturing apparatus.
Figure 8:
Figure 8:
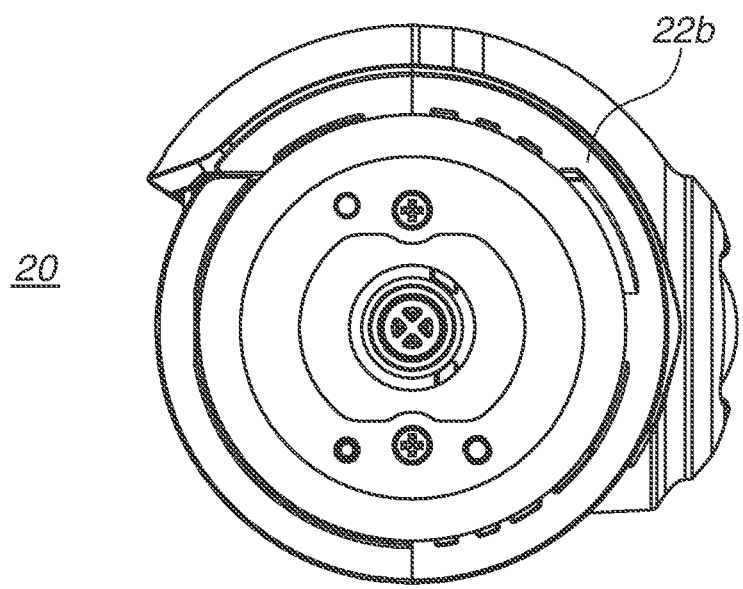

FIG. 8 illustrates a rib shape inside the lens barrel unit 20 and the top cover 11. The top cover 11 is partially illustrated in a cross-sectional shape for the sake of description. The top cover 11 is incorporated from an upper side of the lens barrel unit 20 in a direction of an arrow in FIG. 8. Similar to the spacer member 31, a convex rib 11a (also referred to as a second protrusion portion 11a) having a substantially semicircular shape is formed inside the top cover 11.

(Shapes of Convex Rib 11a of Top Cover 11 and Convex Rib 31a of Spacer Member 31 in Assembly State)

Figure 9:
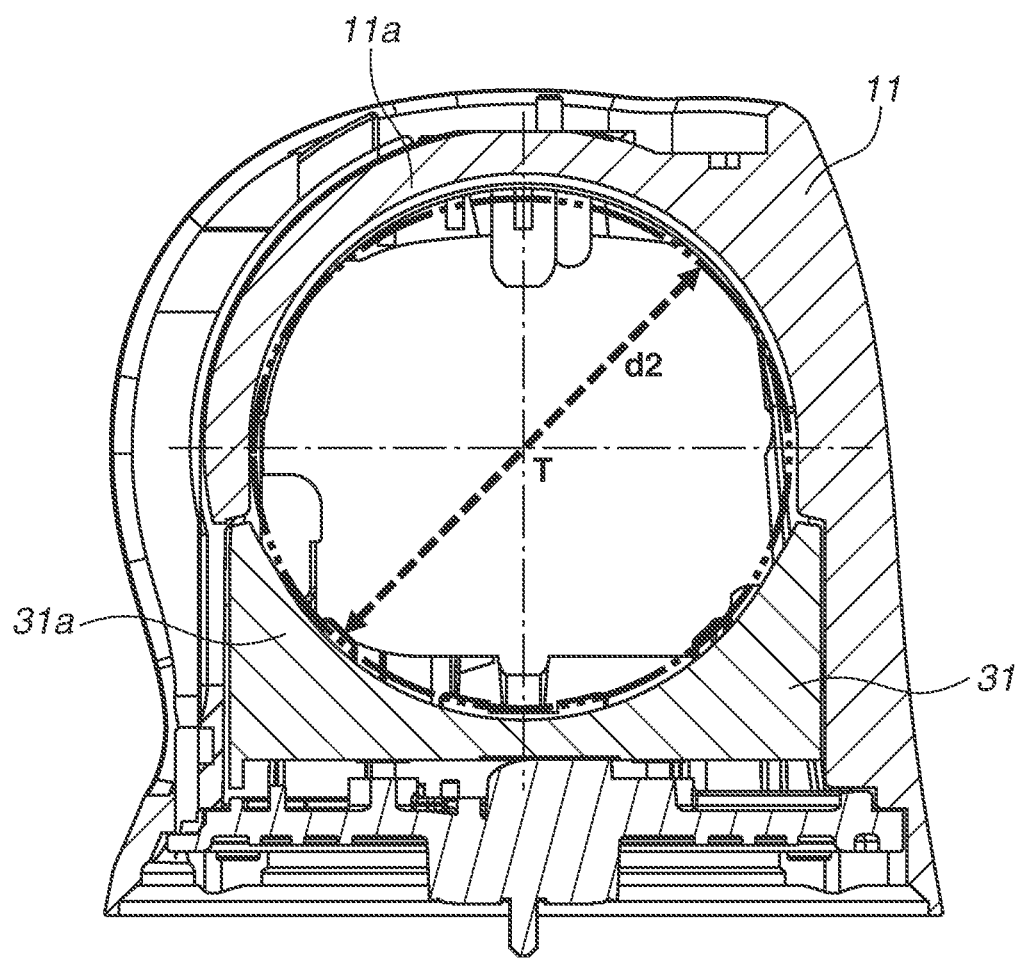
FIG. 9 is a diagram illustrating a cross-sectional view of the rib structure inside the image capturing apparatus.

FIG. 9 is cross-sectional view of shapes of the convex rib 11a of the top cover 11 and the convex rib 31a of the spacer member 31 in the assembly state. The convex rib 11a of the top cover 11 and the convex rib 31a of the spacer member 31 are integrated in this state and thus form a circumferential convex rib centered on the T axis. In a case where an inner circumferential diameter of the circumferential convex rib is defined as d2, a relationship is defined to d1>d2 as compared with the diameter d1 of the annular rib described above in FIG. 7.

(Camera Body 100)

Figure 10A:
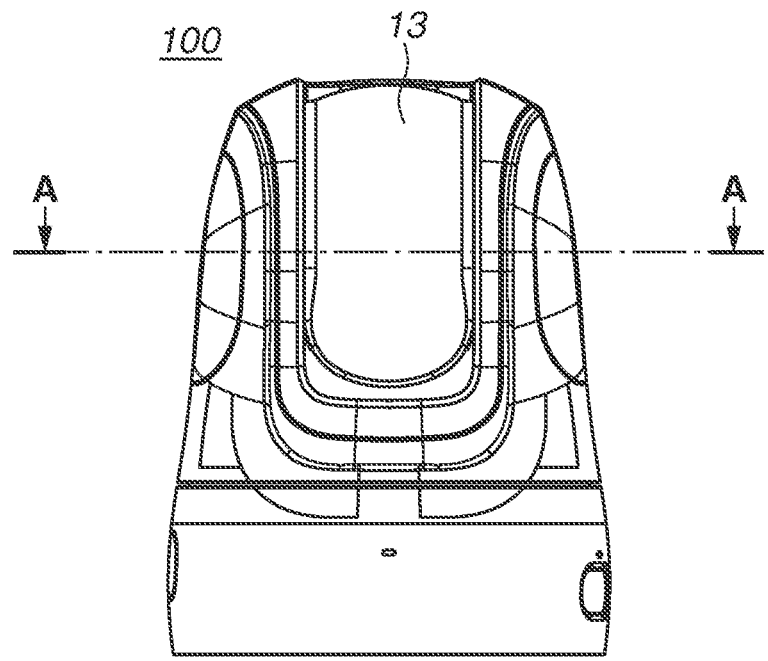
FIG. 10A is a diagram illustrating a front view of the image capturing apparatus.
Figure 10B:
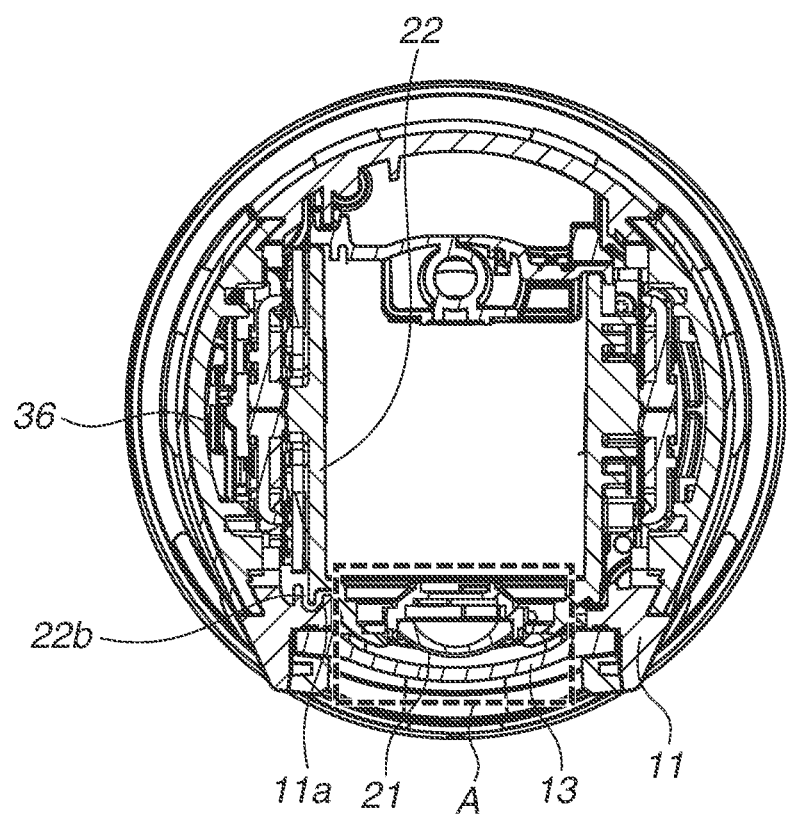
FIG. 10B is a diagram illustrating a cross-sectional view of the internal structure of the image capturing apparatus.

FIG. 10A is a front view of the camera body 100, and FIG. 10B is a cross-sectional view taken along a line AA in FIG. 10A.

A periphery of the G1 lens 21 in the imaging optical system and the dome member 13 covering the front of the G1 lens 21 in FIG. 10B is in a range which fits within a field angle of a lens optical system at the time of image capturing and is indicated as an area A in FIG. 10B. The drive actuator 36 for tilt rotation driving is disposed on a side of a side surface of the camera 100. If the abrasion powder generated in a drive unit of the drive actuator 36 moves to the area A, an issue that the abrasion powder is captured in a captured image occurs. In order to prevent movement of the abrasion powder, a spigot joint shape is formed by the annular rib 22b of the tilt cover 22 and the convex rib 11a inside the top cover 11. The spigot joint shape is formed to separate the area A and an area in which the drive actuator 36 is disposed, from each other. The spigot joint shape is formed by the top cover 11 and the tilt cover 22 in FIGS. 10A and 10B, and the tilt cover 22 and the rear surface cover 23 are integrated to form the 360-degree annular rib as illustrated in FIG. 7. Thus, the spigot joint shape is formed substantially along an entire circumference centered on the T axis. Accordingly, even if the abrasion powder generated in the drive actuator 36 moves in various directions, the spigot joint shape disposed along the entire circumference can prevent the abrasion powder from entering the area A. According to the present exemplary embodiment, the spigot joint shape of the annular rib prevents the movement of the abrasion powder.

However, the movement of the abrasion powder can be further suppressed by applying a viscous material, such as grease, to a surface of the annular rib 22b or the convex rib 11a. In this case, even if the abrasion powder generated in the drive actuator 36 moves to a spigot joint portion, the abrasion powder can be prevented from moving to the area A or another part. In addition, the drive actuator 36 which generates the abrasion powder is disposed below the T axis as the center of the tilt rotation axis of the lens barrel unit 20 in the apparatus body. The abrasion powder generated in the drive actuator 36 basically rarely moves upward and accumulates downward, and thus this arrangement is effective in preventing the abrasion powder from spreading over a wide area in the apparatus.

(Method for Attaching Dome Member 13 and Outer Cover 12 to Top Cover 11)

Figure 11:
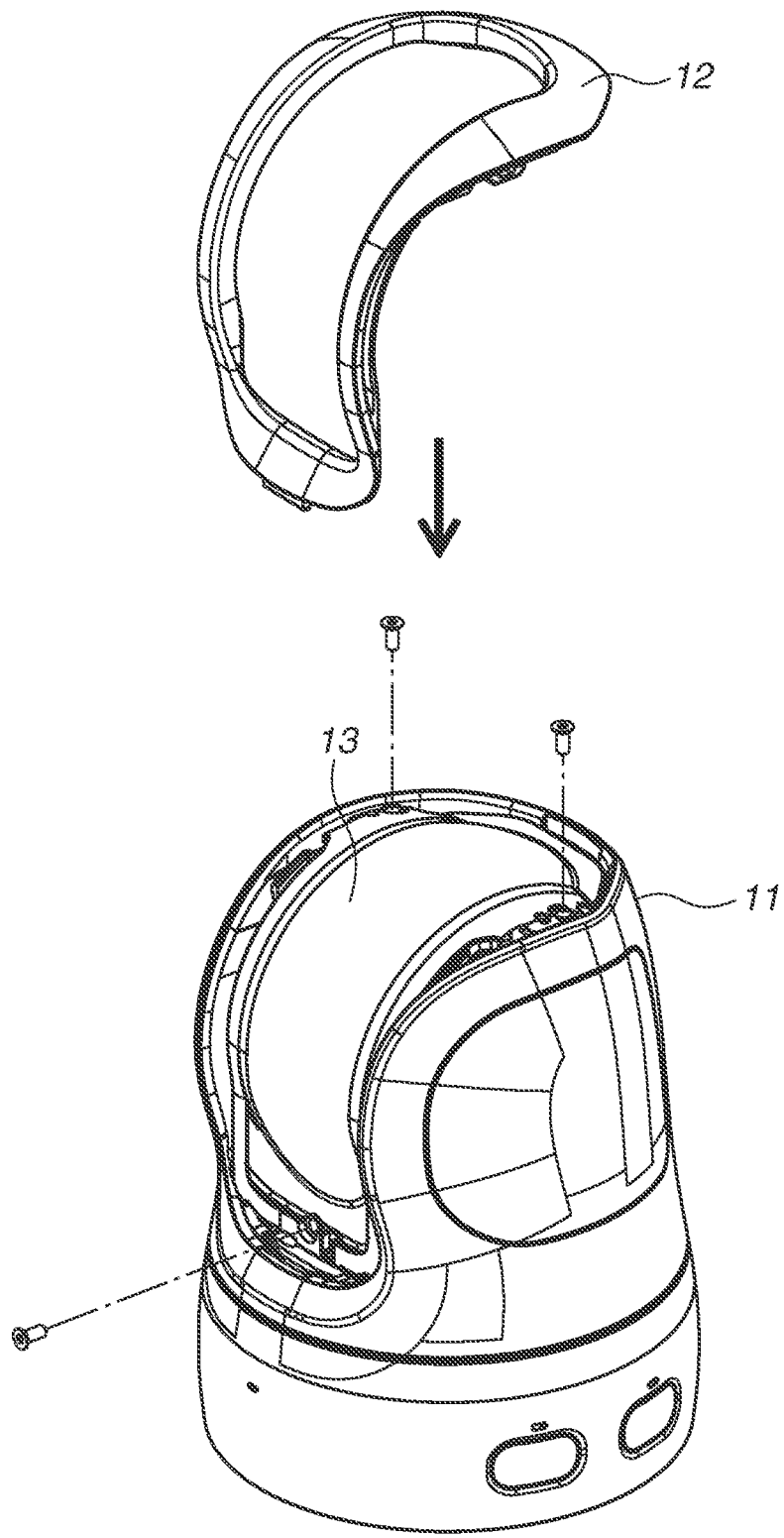
FIG. 11 is a diagram illustrating a method for mounting an outer cover of the image capturing apparatus.

FIG. 11 illustrates a method for attaching the dome member 13 and the outer cover 12 to the top cover 11. The dome member 13 is fixed to the top cover 11 with fastening screws. Further, the outer cover 12 is adhesively fixed from the outside of the dome member 13 with the double-sided adhesive tape (not illustrated).

(Configuration for Preventing Damage to Lens of Imaging Optical System)

Next, a description will be given of a configuration for preventing damage to the lens of the imaging optical system in a case where an impact is applied to the camera 100, with reference to FIGS. 12A and 12B.

Figure 12A:
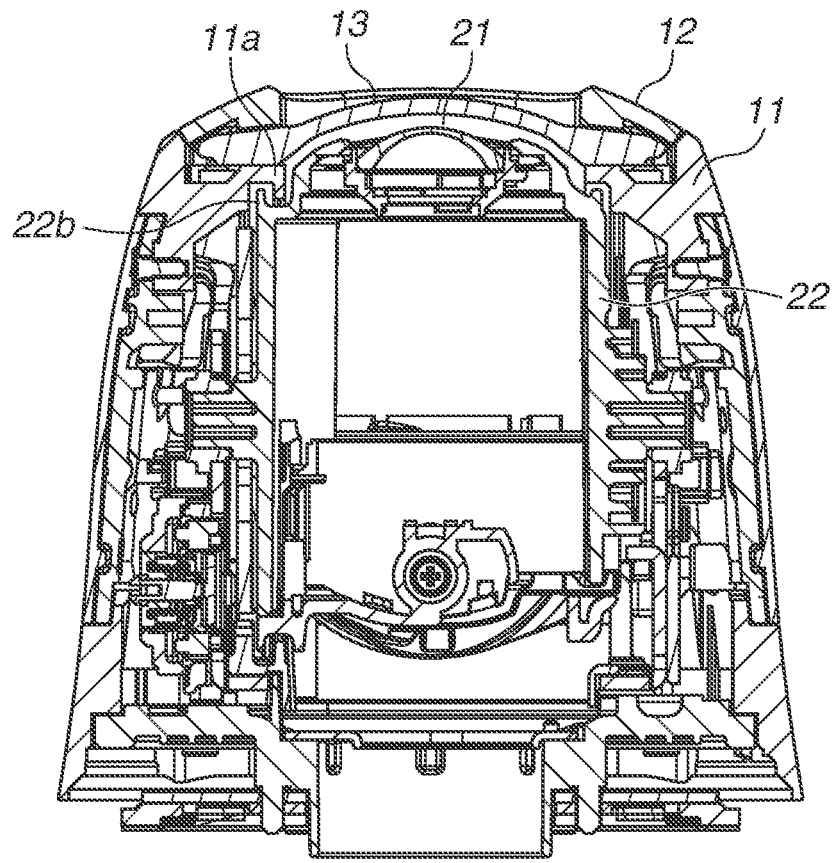
FIGS. 12A and 12B are diagrams illustrating cross-sectional views of the internal structure of the image capturing apparatus.

FIG. 12A is a cross-sectional view of the camera 100 viewed from the front and illustrates a state where the lens barrel unit 20 performs a tilt rotation by 90 degrees just above. In FIG. 12A, the dome member 13 covers the outside with a predetermined clearance with respect to the G1 lens 21 of the imaging optical system. Meanwhile, the annular rib 22b of the tilt cover 22 is held in a state of securing a predetermined clearance with respect to the convex rib 11a of the top cover 11.

Figure 12B:
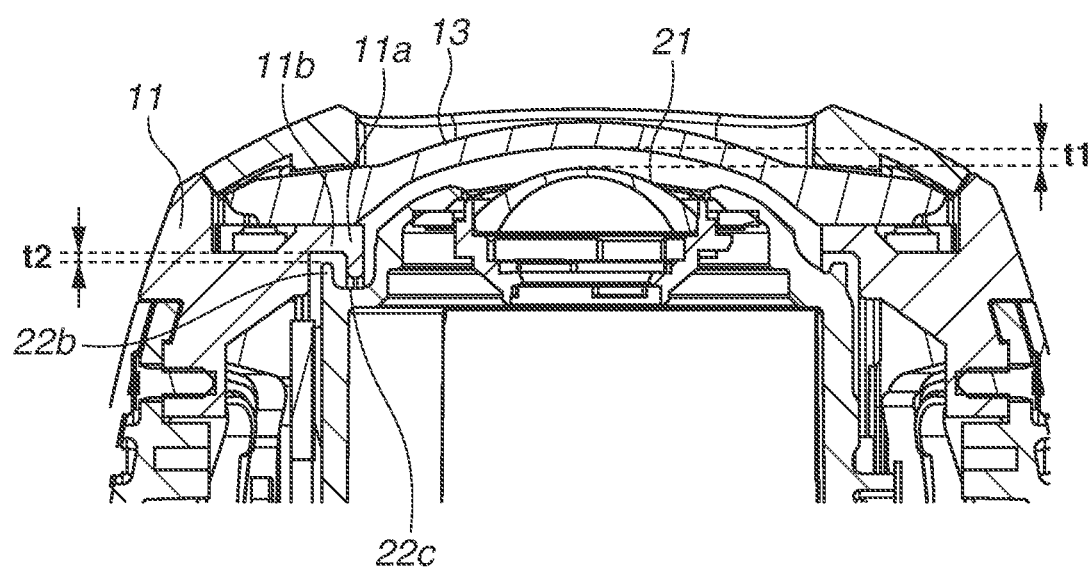

FIG. 12B is an enlarged detailed view of a part of FIG. 12A. In FIG. 12B, a clearance t1 is provided between a tip of the G1 lens 21 and an inside surface of the dome member 13, a clearance t2 is provided between a tip of the annular rib 22b of the tilt cover 22 and a groove portion 11b of the top cover 11. A protrusion amount of the annular ribs 22b and 23b is determined in such a manner that the clearance t2 between the top cover 11 and the lens barrel unit 20 is smaller than the clearance t1 between an inner circumferential surface of the dome member 13 and an outer circumferential surface at a position where the outermost G1 lens 21 of the lens barrel unit 20 is formed.

A relationship of the clearances is determined to t1>t2. Accordingly, in a case where the lens barrel unit 20 is moved due to an impact caused by dropping or hitting the camera 100, the clearance t2 is smaller than the clearance t1, and thus a portion of the clearance t2 always makes contact first. Thus, the G1 lens 21 will not collide with the dome member 13 and be scratched or damaged, whereby occurrence of defect in a captured image can be prevented. Distances of the clearance t1 and the clearance t2 can be changed under the condition of t1>t2, and it is desirable to change a clearance amount according to an estimated impact. For example, a clearance amount of the clearance t2 is determined to a small value at an angle which is frequently used among tilt rotation angles of the lens barrel unit 20, whereby it is possible to increase strength against an impact.

As described above, the rib shape is formed along the entire circumference of a boundary between the drive actuator 36 and the lens barrel unit 20, whereby the abrasion powder generated in the drive actuator 36 is prevented from moving. The clearance amount between the G1 lens 21 and the dome member 13 is determined larger than the clearance amount between the annular rib 22b of the lens barrel unit 20 and the groove portion 11b of the top cover 11, whereby a collision of the dome member 13 with the G1 lens 21 is prevented at the time of impact. Accordingly, defect in a captured image due to the abrasion powder in the drive unit and damage at the time of impact can be prevented.

According to the present exemplary embodiment, first protrusion portions (ribs) 22b and 23b are formed in a circumferential shape centered on the rotation axis of the lens barrel 20 on at least one of the inside of the exterior case 11 and the outside of the lens barrel 20.

An inside of a cross section including the tilt axis is considered. The protrusion amount of the first protrusion portions (ribs) 22b and 23b is determined in such a manner that the clearance t2 between the exterior case 11 and the lens barrel 20 is smaller than the clearance t1 between the inner circumferential surface of the dome member 13 and the outer circumferential surface at the position where the outermost G1 lens 21 of the lens barrel unit 20 is formed. The drive actuator 36 includes the transmission unit 36a which transmits the driving force to the outside and is fixed to the bearing unit 30 in a state where the transmission unit 36a is in pressure contact with the side surface of the tilt rotation plate 25 held by the lens barrel 20.

A case of viewing from a direction of the cross section including the tilt axis is considered.

The second protrusion portion 11a extending from the exterior case 11 in a direction different from that of the tilt axis and the first protrusion portions 22b and 23b extending in the direction different from that of the tilt axis overlap with each other in the direction extending in the direction different from that of the tilt axis. Therefore, the first protrusion portions (ribs) 22b and 23b and the second protrusion portion 11a are formed to separate an area in which the drive actuator 36 for transmitting the driving force to the lens barrel 20 is disposed and an area in which the lens barrel 20 is disposed, from each other. The first protrusion portions (ribs) 22b and 23b and the second protrusion portion 11a are formed along the entire circumference centered on the bearing unit 30 in the panning rotation direction of the lens barrel 20. Centers of the first protrusion portions (ribs) 22b and 23b and the second protrusion portion 11a formed along the entire circumference coincide with each other. Lubricant is applied on surfaces of the annular ribs 22b and 23b. The drive actuator 36 is fixed to the bearing unit 30 in the state where the transmission unit 36a is in pressure contact with the side surface of the tilt rotation plate 25 held by the lens barrel 20 and is disposed below the center of the tilt rotation axis of the lens barrel 20 in the image capturing apparatus 100.

A second exemplary embodiment of the present disclosure is described in detail below with reference to the drawings.

(Drawing of Shape of Outer Cover 12)

Figure 13A:
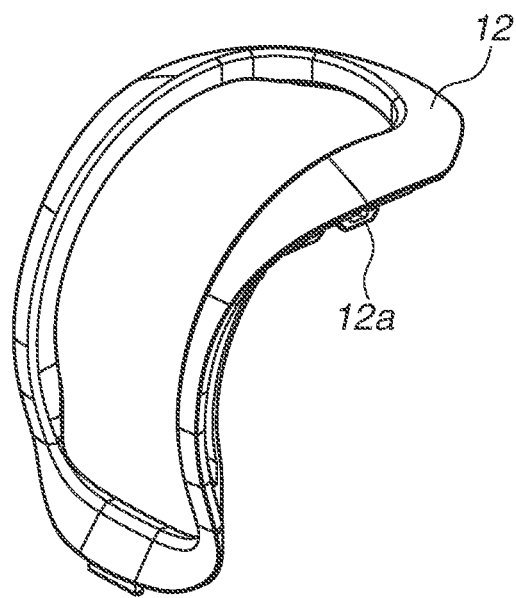
FIGS. 13A and 13B are diagrams illustrating perspective views of a shape of the outer cover of the image capturing apparatus.
Figure 13B:
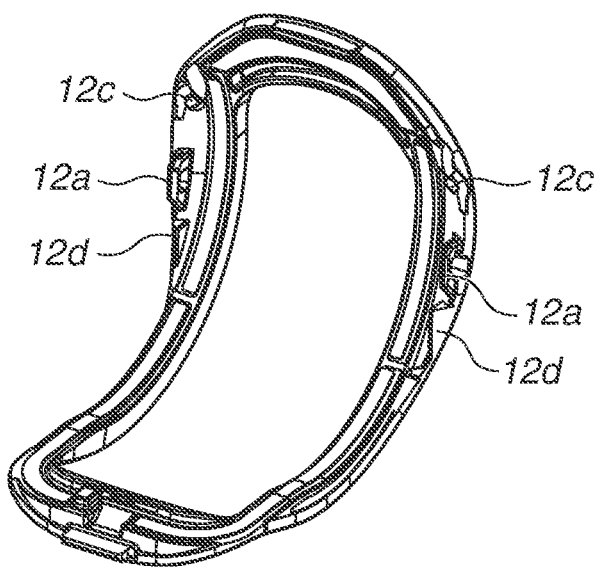

FIGS. 13A and 13B illustrate a shape of an outer cover 12 of an image capturing apparatus according to the present exemplary embodiment. FIGS. 13A and 13B are perspective views on an external appearance surface side and on an internal appearance surface side, respectively. In FIGS. 13A and 13B, the outer cover 12 formed of a resin material has a shape covering over a center opening portion. Hook portions 12a are formed on both sides of the opening portion on the internal appearance surface side of the outer cover 12. A contact portion 12c and a width regulating portion 12d formed on the outer cover 12 have a shape for regulating a width direction at the time of assembly.

(Method for Assembling Outer Cover 12 to Apparatus)

Figure 14:
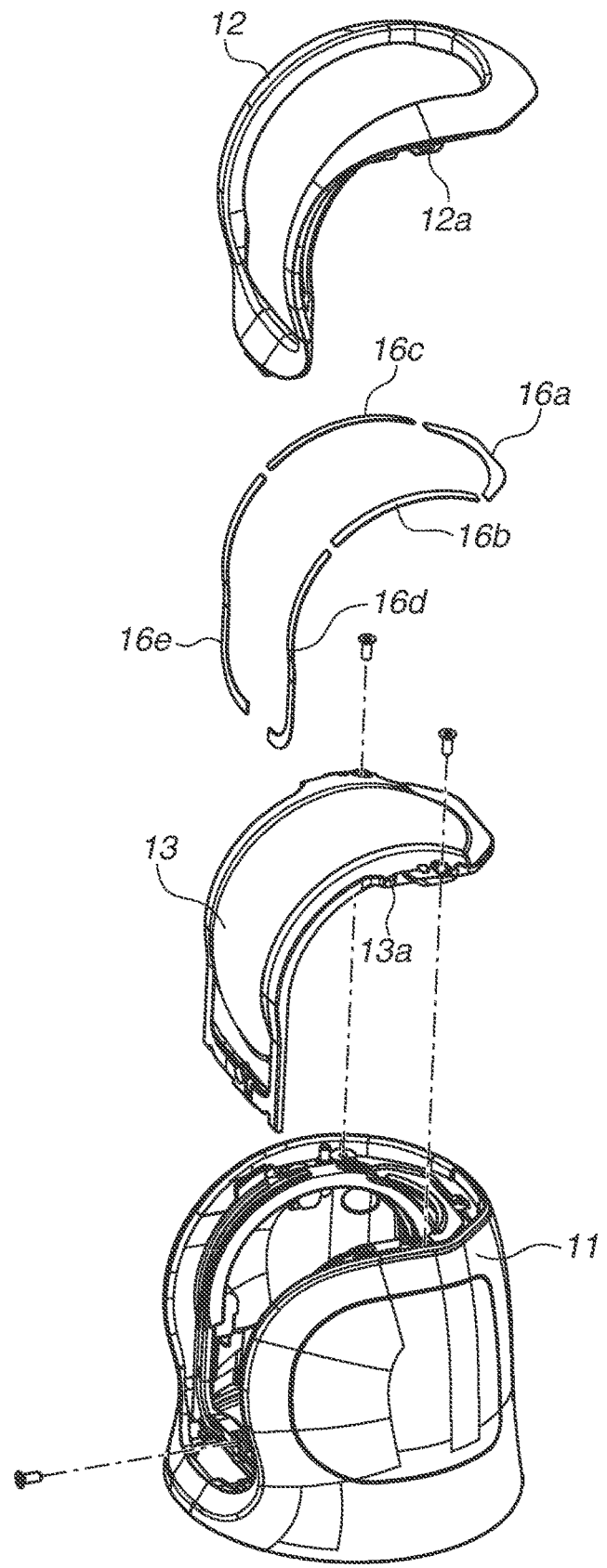
FIG. 14 is a diagram illustrating an exploded perspective view of a cover configuration of the image capturing apparatus.

Next, a description will be given of a method for assembling the outer cover 12 to the camera 100, with reference to FIG. 14. FIG. 14 is an exploded perspective view of a configuration of external appearance components of the camera 100.

The top cover 11 is an exterior case formed to cover a periphery of the above-described lens barrel unit 20. The dome member 13 is fastened to the top cover 11 with a plurality of screws. Further, the outer cover 12 is attached to the dome member 13 as a part of the external appearance. At that time, the outer cover 12 is adhesively fixed to the dome member 13 with a plurality of double-sided adhesive tapes 16a, 16b, 16c, 16d, and 16e (also referred to as a double-sided adhesive tape 16 a fixing unit 16 and a double-sided adhesive 16). Further, two hook portions 12a formed on the outer cover 12 engage with an engagement click 13a (also referred to as an engagement unit 13a) of the dome member 13 in the assembly state.

(External Appearance Shape of Outer Cover 12)

Figure 15A:
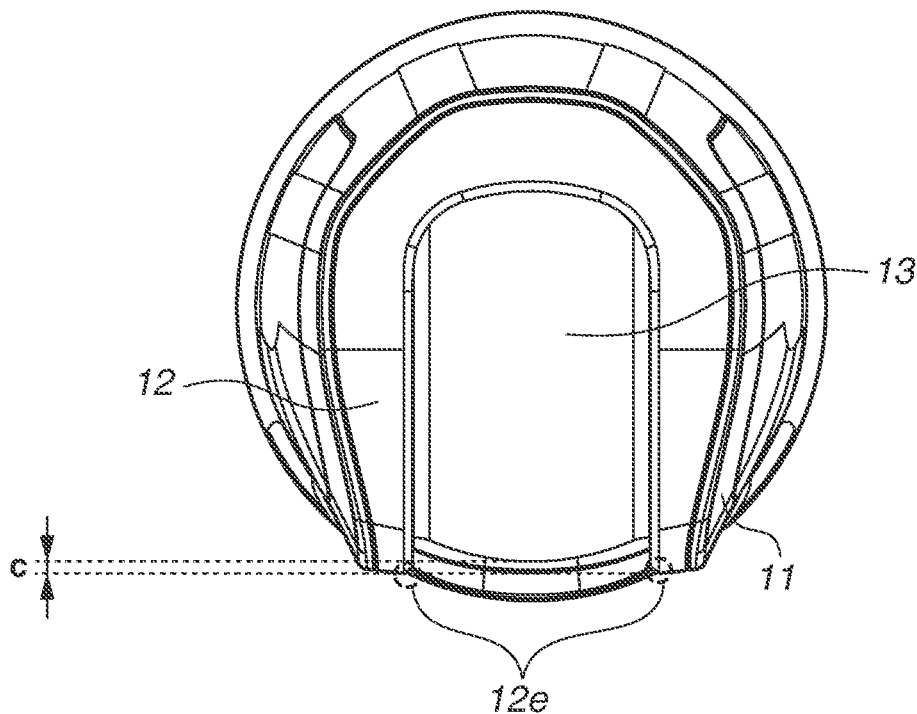
FIG. 15A is a diagram illustrating a top view of the image capturing apparatus.
Figure 15B:
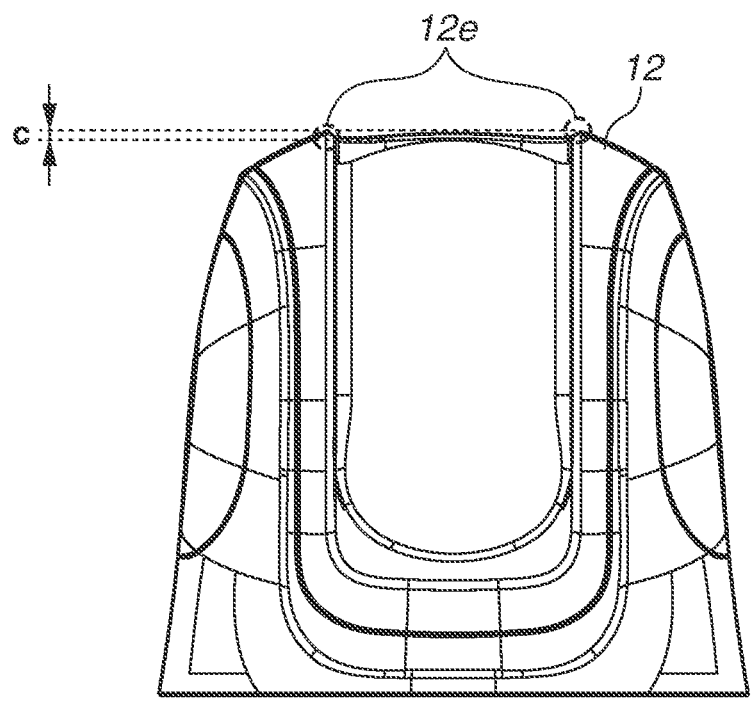
FIG. 15B is a diagram illustrating a front view of the image capturing apparatus.

Next, a description will be given of an external appearance shape of the outer cover 12, with reference to FIGS. 15A and 15B. FIGS. 15A and 15B are a top view and a front view of the camera 100, respectively. In FIGS. 15A and 15B, apex portions 12e are formed on an external appearance surface of the outer cover 12 on both sides of the dome member 13. Each of the apex portions 12e is determined to be projected more than a tip of a spherical shape of the dome member 13 with respect to an external appearance surface side. Due to a distance C between the apex portions 12e and the tip of the dome member 13, in a case where the camera 100 collides with something, the dome member 13 can be prevented from coming into contact with the outer cover 12 and being damaged. The distance C can be determined to a certain value obtained by calculating a deformation amount of the outer cover 12 based on an estimated impact force applied to the camera 100. The apex portions 12e may be formed with respect to the entire circumference around the dome member 13, and thus the dome member 13 can be prevented from being damaged by an impact from any direction.

(Structure Inside Outer Cover 12)

Figure 16A:
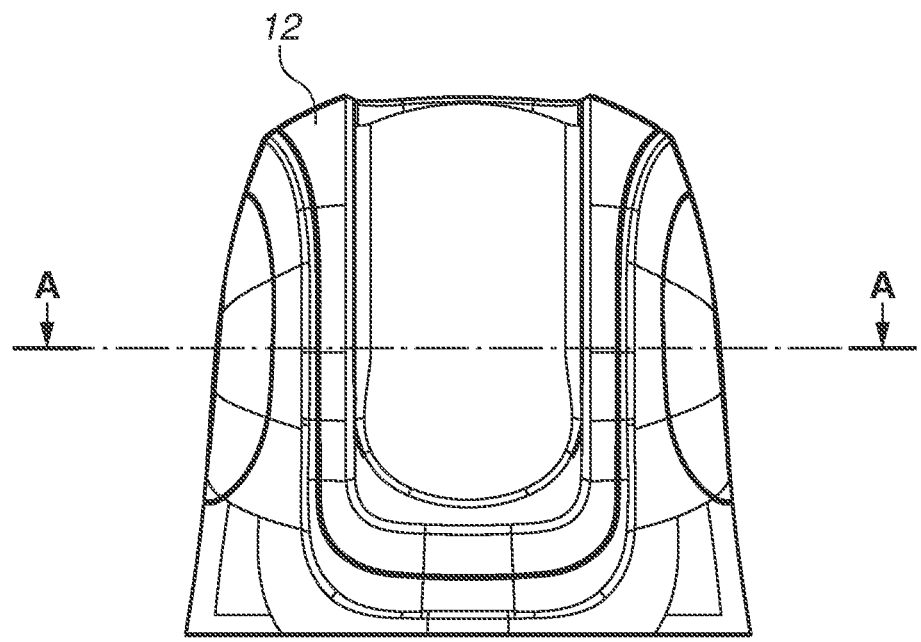
FIG. 16A is a diagram illustrating a configuration around a top cover of the image capturing apparatus.
Figure 16B:
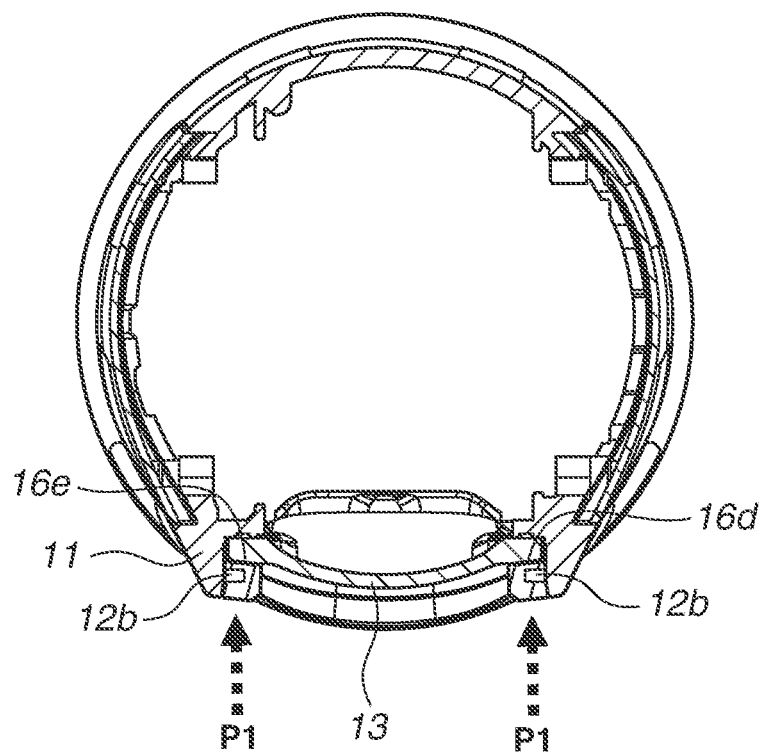
FIG. 16B is a cross-sectional view of the top cover.

FIG. 16A illustrates a configuration around the top cover 11 viewed in a front direction of the camera 100, and FIG. 16B is a cross-sectional view taken along a line AA in FIG.

16A. In FIG. 16B, the outer cover 12 is fixed to the external appearance surface of the dome member 13 with the double-sided adhesive tapes 16d and 16e. Cavity portions 12b are formed in concave shapes on both sides of the outer cover 12, and thus in a case where an external force indicated by an arrow P1 (also referred to as an external force P1) in FIG. 16B is applied, the cavity portions 12b can be elastically deformed in a direction of the arrow P1. Accordingly, in a case where the external force indicated by the arrow P1 is applied to the outer cover 12, an impact applied to the dome member 13 is mitigated, and damage, such as cracking of the dome member 13, is prevented.

Figure 17A:
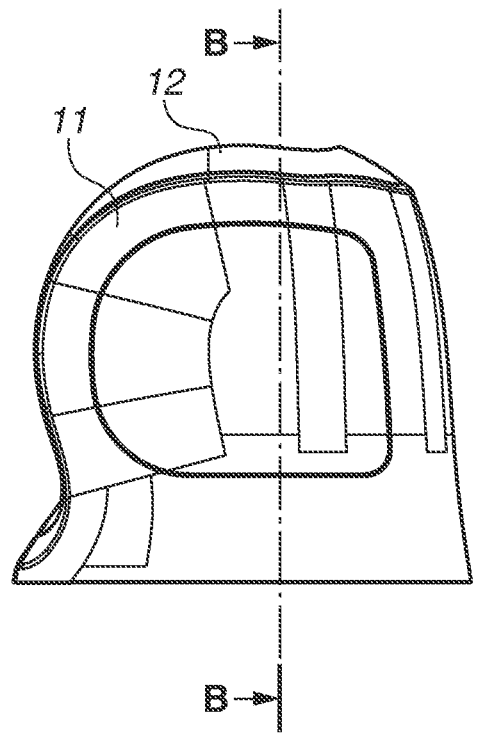
FIG. 17A is a diagram illustrating a configuration around the top cover of the image capturing apparatus.
Figure 17B:
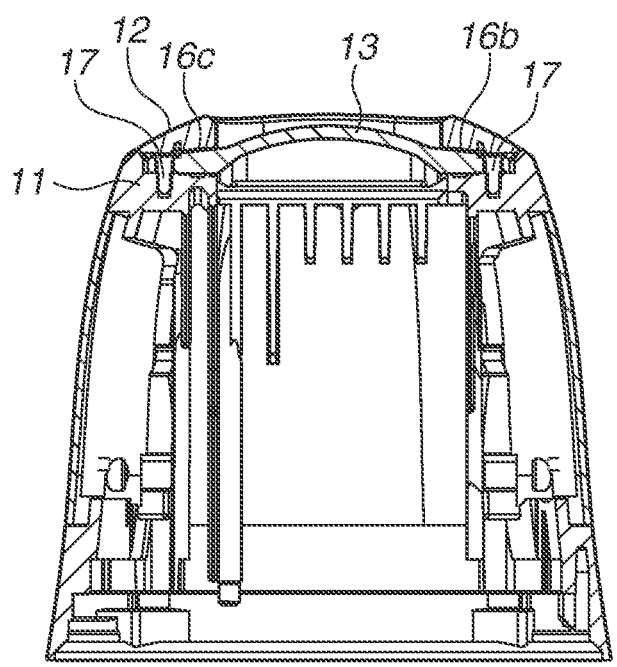
FIG. 17B is a cross-sectional view of the top cover.

FIG. 17A illustrates the configuration around the top cover 11 viewed in a camera side surface direction, and FIG. 17B is a cross-sectional view taken along a line BB in FIG. 17A. In FIG. 17B, the outer cover 12 is fixed to the external appearance surface of the dome member 13 with the above-described double-sided adhesive tapes 16b and 16c. The dome member 13 is fixed to the top cover 11 with fastening screws 17.

(Detailed Cross-Sectional View of Dome Member 13, Outer Cover 12, and Fastening Screws 17)

Figure 18:
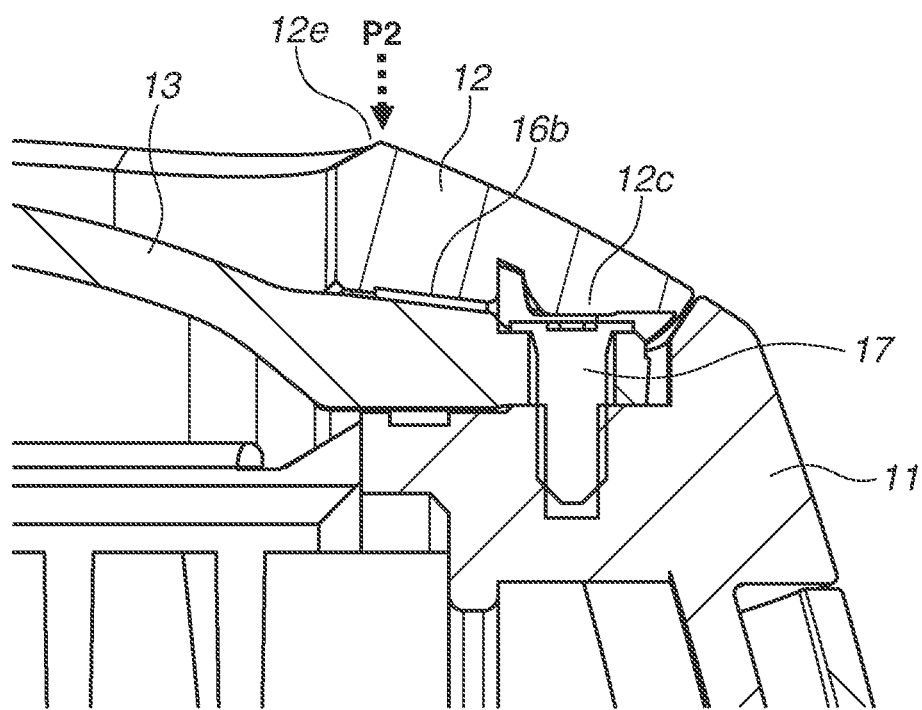
FIG. 18 is a diagram illustrating a cross-sectional view of an outer cover configuration of the image capturing apparatus.

FIG. 18 is a detailed cross-sectional view of the dome member 13, the outer cover 12, and the fastening screws 17. In FIG. 18, the outer cover 12 is fixed to the external appearance surface of the dome member 13 with the above-described double-sided adhesive tape 16b. The dome member 13 is fixed to the top cover 11 with the fastening screw 17. The contact portion 12c formed in a convex shape on the outer cover 12 is configured to approach a head portion of the fastening screw 17 in this state. In a case where the outer cover 12 receives an external force indicated by an arrow P2 in FIG. 18, the contact portion 12c comes into contact with the head portion of the fastening screw 17 and can mitigate an impact on the dome member 13. According to the present exemplary embodiment, the contact portion 12c is configured to approach the fastening screw 17, but may be configured to approach a part of the top cover 11 instead of the fastening screw 17. If a material having cushioning property is used for the double-sided adhesive tapes 16b and 16c for fixing the outer cover 12, an impact on the dome member 13 can be further mitigated.

(Shape of Cavity Portion 12b of Outer Cover 12)

Figure 19:
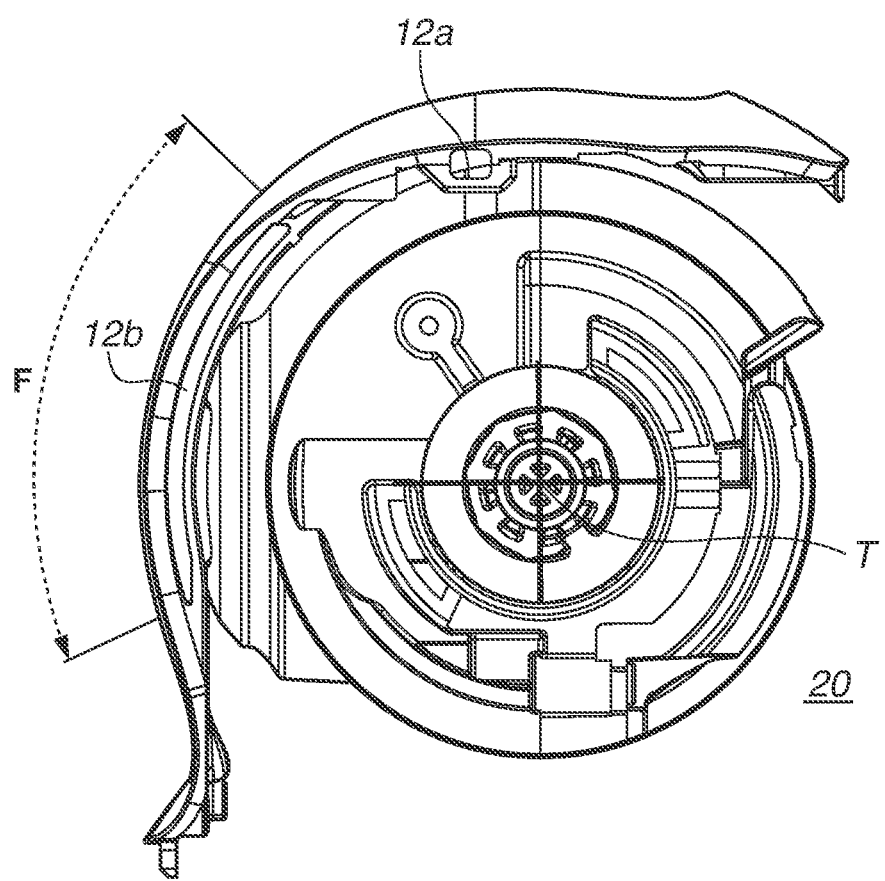
FIG. 19 is a cross-sectional view of the outer cover configuration of the image capturing apparatus.

Next, a shape of the cavity portion 12b of the outer cover 12 is described with reference to FIG. 19. The T axis represents the tilt rotation center of the lens barrel unit 20, and a groove shape of the cavity portion 12b is formed in an arc shape centered on the T axis. Thus, in a case where an external force is applied in a range F in FIG. 19, the cavity portion 12b can be elastically deformed and mitigate the impact. An angle of the range F in which the cavity portion 12b is formed may be determined wider, and thus a range which can mitigate an impact can be extended. According to the present exemplary embodiment, the frame member 12 is formed to cover the external appearance surface of the dome member 13 in an outside of the image capturing area of the lens barrel 20. The frame member 12 includes the cavity portion 12b having an elastically deformable shape and the contact portion 12c which comes into contact with the fastening screws 17 which is a member having rigidity higher than that of the dome member 13 in a case where an impact is applied to the image capturing apparatus. The frame member 12 includes the apex portions 12e protruding toward the external appearance surface side across the dome member 13. At the apex portions 12e of the frame member 12, a straight line connecting arbitrary two points across the dome member 13 is located on the external appearance surface side of the dome member 13. The cavity portion 12b of the frame member 12 is formed in an arc shape centered on the rotation axis of the lens barrel 20.

(Double-Sided Adhesive Tape 16 of Outer Cover 12)

Figure 20A:
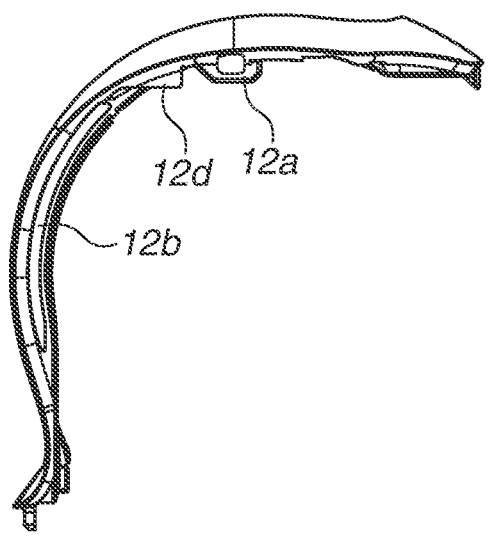
FIG. 20A is a diagram illustrating a side view of the outer cover.
Figure 20B:
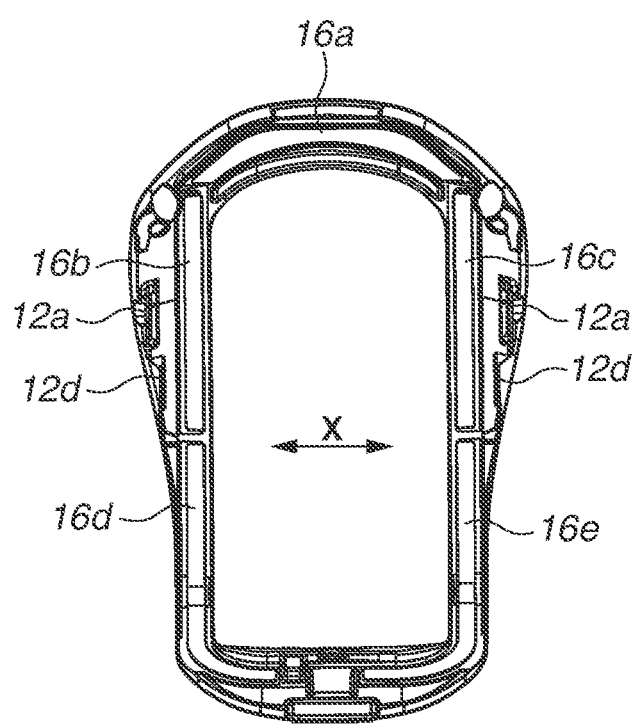
FIG. 20B is a diagram illustrating an inside view of the outer cover.

Next, a description will be given of the double-sided adhesive tape 16 of the outer cover 12, with reference to FIGS. 20A and 20B. FIGS. 20A and 20B are a side view and an inside view of the outer cover 12, respectively. As illustrated in FIG. 20A, the hook portion 12a which engages with the engagement click 13a of the dome member 13 is formed on the outer cover 12 near a top surface portion. The hook portion 12a is formed at a position out of the range F near the front surface portion viewed in the camera side surface direction in FIG. 19. The width regulating portion 12d is formed on the outer cover 12 and performs positioning in an X direction in FIG. 20B in when the outer cover 12 is assembled to the top cover 11 by a method described below. As illustrated in FIG. 20B, the plurality of double-sided adhesive tapes 16a, 16b, 16c, 16d, and 16e is provided to fix the outer cover 12.

A description will be given of a method for improving workability of removal by determining the plurality of double-sided adhesive tapes 16 with different adhesive forces. According to the present exemplary embodiment, the double-sided adhesive tapes 16b and 16c have an adhesive force weaker than an adhesive force of the other double-sided adhesive tapes 16a, 16d and 16e. This is because the hook portion 12a engages with the engagement click 13a of the dome member 13 in the assembly state, and thus the outer cover 12 can be fixed without relying only on the adhesive forces of the double-sided adhesive tape 16. In a case of disengagement in a reworking operation and the like, since the adhesive force of the double-sided adhesive tapes 16b and 16c is weak, the outer cover 12 can be easily removed in a process to disengage the hook portion 12a. The adhesive force of the double-sided adhesive tapes 16a, 16d and 16e disposed to places other than the hook portion 12a is strong, so that the outer cover 12 can be securely fixed to the dome member 13.

The fixing unit 16 is provided to fix the frame member 12 to the external appearance surface of the dome member 13. The fixing unit 16 includes the plurality of double-sided adhesives 16 having different adhesive forces. The hook portion 12a which engages with the engagement unit 13a formed on the dome member 13 is formed on the frame member 12. The adhesive force of first double-sided adhesives 16b and 16c disposed at a position closer than a predetermined position of the hook portion 12a is weaker than the adhesive force of second double-sided adhesives 16a, 16d and 16e disposed at a position farther than the predetermined position of the hook portion 12a. The fixing unit 16 is not disposed at a position closer than the predetermined position of the hook portion 12a.

(Method for Mitigating Impact on Dome Member 13)

Next, a direction of an external force applied to the camera 100 and a method for mitigating an impact on the dome member 13 are described with reference to FIGS. 21A and 21B.

Figure 21A:
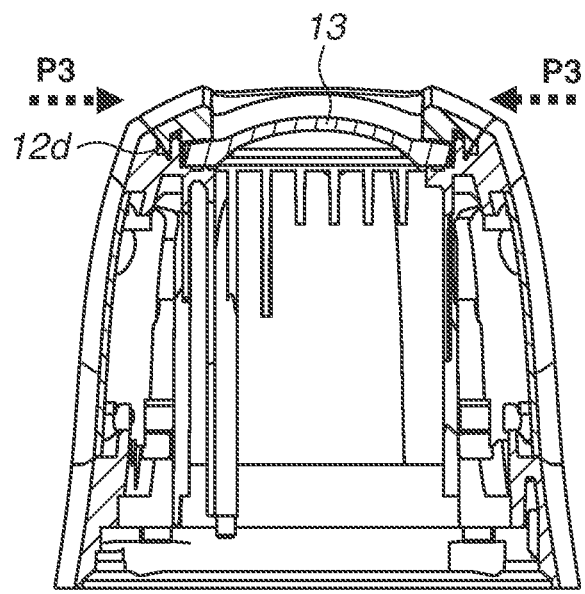
FIGS. 21A and 21B are a diagram illustrating cross-sectional views of an impact mitigation structure of the image capturing apparatus.
Figure 21B:
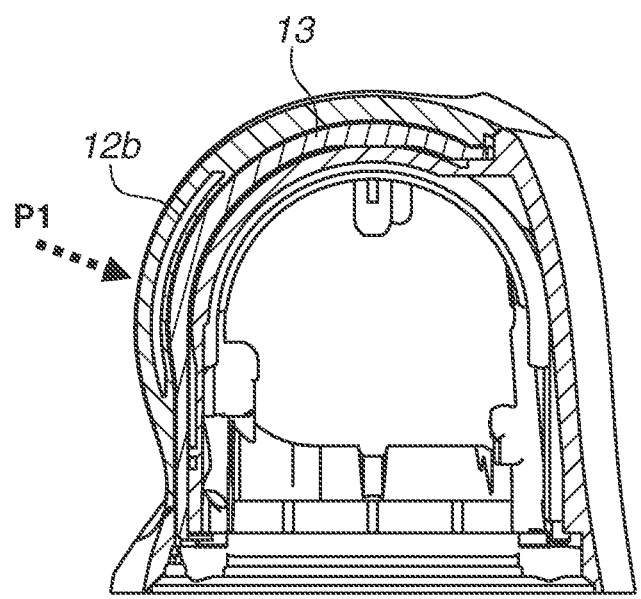

FIGS. 21A and 21B are cross-sectional views in the front direction and in a side surface direction, respectively. In FIG. 21A, if an external force P3 is applied from the side surface direction of the camera 100, the outer cover 12 tends to be deformed in a direction of the external force P3.

Figure 22:
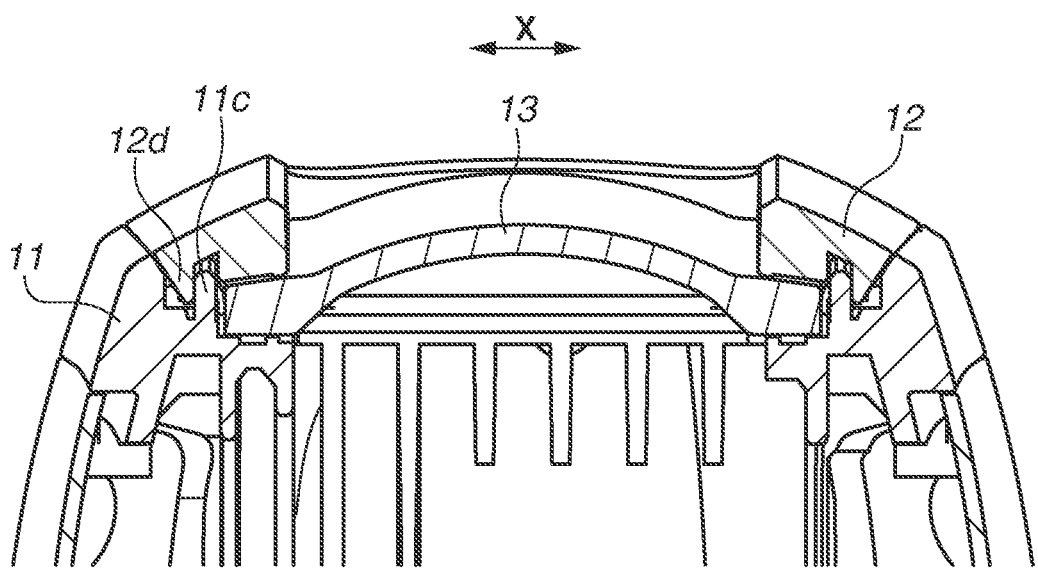
FIG. 22 is a cross-sectional view of the impact mitigation structure of the image capturing apparatus.

As illustrated in a detailed drawing in FIG. 22, the width regulating portion 12d of the outer cover 12 is in contact with a regulating rib 11c of the top cover 11, thus the deformation can be reduced or suppressed in the X direction in FIG. 22. Accordingly, the outer cover 12 can be suppressed from being deformed on the side of the dome member 13 and an impact on the dome member 13 can be prevented. As described above, the impact corresponding to the external force P3 in FIG. 21A can be mitigated by the contact portion of the width regulating portion 12d, and the impact corresponding to the external force P1 in FIG. 21B can be mitigated by elastic deformation of the above-described cavity portion 12b. As described above, the external forces from the respective directions, namely the external forces P1, P2, and P3 are respectively mitigated by the elastic deformation of the cavity portion (12b), the contact portion 12c, and the width regulating portion 12d which are formed on the outer cover 12, so that the impact on the dome member 13 is mitigated. Accordingly, in a case where the camera 100 is dropped in various directions, the dome member 13 can be prevented from being damaged.

While the present disclosure has been described with reference to exemplary embodiments, it is to be understood that the present disclosure is not limited to the disclosed exemplary embodiments. The scope of the following claims is to be accorded the broadest interpretation so as to encompass all modifications, equivalent structures, and functions.

INDUSTRIAL APPLICABILITY

The present disclosure can be applied to a digital camera as an image capturing apparatus. The present disclosure can be applied to a single lens reflex camera, a mirror-less camera, a compact camera, a monitoring camera, a broadcast camera, a wearable camera, and the like.

According to the present disclosure, an image capturing apparatus which can save a space and prevent dust and the like generated in an actuator inside the image capturing apparatus from being captured in an image can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-161440, filed Sep. 25, 2020, which is hereby incorporated by reference herein in its entirety.

What is claimed is:

1. An image capturing apparatus comprising:
   an exterior case;
   a lens barrel configured to hold a lens, to be disposed in the exterior case, and to be held rotatably around a tilt axis extending in a direction different from a direction of an optical axis of the lens;
   a bearing unit configured to hold the lens barrel to perform tilt rotation;
   an actuator configured to be held by the bearing unit and to generate a driving force for rotating the lens barrel; and
   a dome member configured to be attached to the exterior case and to cover an area on an object side of the lens barrel,
   wherein a first protrusion portion is formed in a circumferential shape centered on a rotation axis of the lens barrel on at least one of an inside of the exterior case and an outside of the lens barrel, and
   wherein, in a cross section including the tilt axis, a protrusion amount of the first protrusion portion is determined in such a manner that a clearance between the exterior case and the lens barrel is smaller than a clearance between an inner circumferential surface of the dome member and an outer circumferential surface where an outermost lens of the lens barrel is formed.

2. The image capturing apparatus according to claim 1, wherein the actuator includes a transmission unit configured to transmit the driving force to the lens barrel, and the transmission unit is fixed to the bearing unit in a state where the transmission unit is in pressure contact with a side surface of a rotation plate held by the lens barrel.

3. The image capturing apparatus according to claim 1, wherein, when viewed in a direction of a cross section including the tilt axis, a second protrusion portion extending from the exterior case in a direction different from a direction of the tilt axis and the first protrusion portion extending in the direction different from the direction of the tilt axis are formed in such a manner that the second protrusion portion and the first protrusion portion overlap with each other in the direction extending in the direction different from the direction of the tilt axis, to separate an area in which the actuator for transmitting the driving force to the lens barrel is disposed and an area in which the lens barrel is disposed, from each other.

4. The image capturing apparatus according to claim 3, wherein the first protrusion portion and the second protrusion portion are formed along an entire circumference centered on the bearing unit in a panning rotation direction of the lens barrel, and wherein a center of the first protrusion portion and a center of the second protrusion portion formed along the entire circumference coincide with each other.

5. The image capturing apparatus according to claim 1, wherein lubricant is applied on a surface of the first protrusion portion.

6. The image capturing apparatus according to claim 1, wherein the actuator is fixed to the bearing unit in a state where the transmission unit is in pressure contact with a side surface of a rotation plate held by the lens barrel and is disposed at a position lower than a center of a tilt rotation axis of the lens barrel in the image capturing apparatus.

* * * * *